United States Patent
Haga et al.

(10) Patent No.: US 10,328,874 B2
(45) Date of Patent: Jun. 25, 2019

(54) METHOD FOR HANDLING CASE OF DETECTING UNAUTHORIZED FRAME TRANSMITTED OVER ONBOARD NETWORK

(71) Applicant: Panasonic Intellectual Property Corporation of America, Torrance, CA (US)

(72) Inventors: Tomoyuki Haga, Nara (JP); Hideki Matsushima, Osaka (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 204 days.

(21) Appl. No.: 15/249,513

(22) Filed: Aug. 29, 2016

(65) Prior Publication Data
US 2016/0373449 A1 Dec. 22, 2016

Related U.S. Application Data

(63) Continuation of application No. PCT/JP2015/005720, filed on Nov. 17, 2015.
(Continued)

(30) Foreign Application Priority Data

Nov. 5, 2015 (JP) .................................. 2015-217211

(51) Int. Cl.
*G08G 1/16* (2006.01)
*B60R 16/023* (2006.01)
(Continued)

(52) U.S. Cl.
CPC ........... *B60R 16/023* (2013.01); *G08G 1/162* (2013.01); *H04W 4/046* (2013.01); *H04W 12/12* (2013.01);
(Continued)

(58) Field of Classification Search
CPC ...................................................... G08G 1/162
See application file for complete search history.

(56) References Cited

U.S. PATENT DOCUMENTS

2005/0088318 A1* 4/2005 Liu ...................... G08G 1/0965
340/902
2007/0018800 A1* 1/2007 Boss ...................... B60Q 9/008
340/435
(Continued)

FOREIGN PATENT DOCUMENTS

JP 11-039586 A 2/1999
JP 2002-222485 8/2002
(Continued)

OTHER PUBLICATIONS

International Search Report of PCT application No. PCT/JP2015/005720 dated Feb. 16, 2016.
(Continued)

*Primary Examiner* — David J Pearson
(74) *Attorney, Agent, or Firm* — Greenblum & Bernstein, P.L.C.

(57) ABSTRACT

An anomaly handling method that suitably handles a case where the possibility of a vehicle being unauthorizedly controlled so as to suppress the effects thereof is provided. In an anomaly handling method used in one or a plurality of electronic control units installed in one vehicle, an inter-vehicle communication message transmitted from a device installed in the other vehicle is received as an anomaly detection notification, the anomaly detection notification
(Continued)

being issued when an unauthorized frame is detected on an onboard network installed in another vehicle, and an anomaly handling processing is selected from a plurality of predetermined anomaly handling processing in accordance with the received content to transition to a safe state for example, and the selected anomaly handling processing is executed.

13 Claims, 21 Drawing Sheets

Related U.S. Application Data

(60) Provisional application No. 62/105,244, filed on Jan. 20, 2015.

(51) Int. Cl.
*H04W 4/04* (2009.01)
*H04W 12/12* (2009.01)
*H04L 12/40* (2006.01)
*H04L 29/06* (2006.01)

(52) U.S. Cl.
CPC ...... *H04L 63/1408* (2013.01); *H04L 63/1466* (2013.01); *H04L 2012/40273* (2013.01)

(56) References Cited

U.S. PATENT DOCUMENTS

| | | | | |
|---|---|---|---|---|
| 2008/0275618 | A1* | 11/2008 | Grimm | G08G 1/162 701/96 |
| 2010/0019932 | A1* | 1/2010 | Goodwin | G08G 1/162 340/902 |
| 2013/0083679 | A1* | 4/2013 | Krishnaswamy | G08G 1/093 370/252 |
| 2013/0278442 | A1* | 10/2013 | Rubin | G08G 9/02 340/905 |
| 2015/0191135 | A1* | 7/2015 | Ben Noon | B60R 16/023 726/22 |
| 2015/0271201 | A1* | 9/2015 | Ruvio | H04L 63/1408 726/23 |
| 2015/0353008 | A1* | 12/2015 | Kline | B60W 40/04 340/993 |

FOREIGN PATENT DOCUMENTS

| | | |
|---|---|---|
| JP | 2007-310457 | 11/2007 |
| JP | 2014-183395 | 9/2014 |

OTHER PUBLICATIONS

The Extended European Search Report dated Mar. 23, 2018 for European Patent Application No. 15878675.6.

\* cited by examiner

| ID | DATA LENGTH (BYTES) | DATA RANGE | CYCLE (ms) |
|---|---|---|---|
| 0x100 | 8 | 0 - 180 | 10 |
| 0x200 | 8 | 0 - 10000 | 10 |
| 0x300 | 8 | 0 - 9999999 | 20 |
| 0x400 | 1 | 0, 1 | 1000 |
| ... | ... | ... | ... |

FIG. 7

| FUNCTION TYPE | ID | LEVEL |
|---|---|---|
| DRIVE-RELATED FUNCTIONS | 0x100, 0x200, 0x300 | 4 |
| CHASSIS-RELATED FUNCTIONS | 0x500 | 4 |
| SAFETY/COMFORT FUNCTIONS | 0x10 | 3 |
| BODY-RELATED FUNCTIONS | 0x400 | 2 |
| ITS FUNCTIONS | 0x600 | 1 |
| TELEMATICS FUNCTIONS | 0x700 | 1 |
| INFOTAINMENT FUNCTIONS | 0x800 | 1 |

| | | |
|---|---|---|
| COMMON APPLICATION HEADER PORTION | COMMON APPLICATION HEADER INFORMATION | 301 |
| COMMON APPLICATION DATA PORTION | CLOCK TIME INFORMATION | 302 |
| | POSITION INFORMATION | 303 |
| | VEHICLE STATE INFORMATION | 304 |
| | VEHICLE ATTRIBUTES INFORMATION | 305 |
| FREE APPLICATION HEADER PORTION | FREE APPLICATION HEADER INFORMATION | 306 |
| FREE APPLICATION DATA PORTION | LEVEL INFORMATION | 307 |
| | UNAUTHORIZED VEHICLE POSITION INFORMATION | 308 |
| | SIGNATURE DATA | 309 |

300

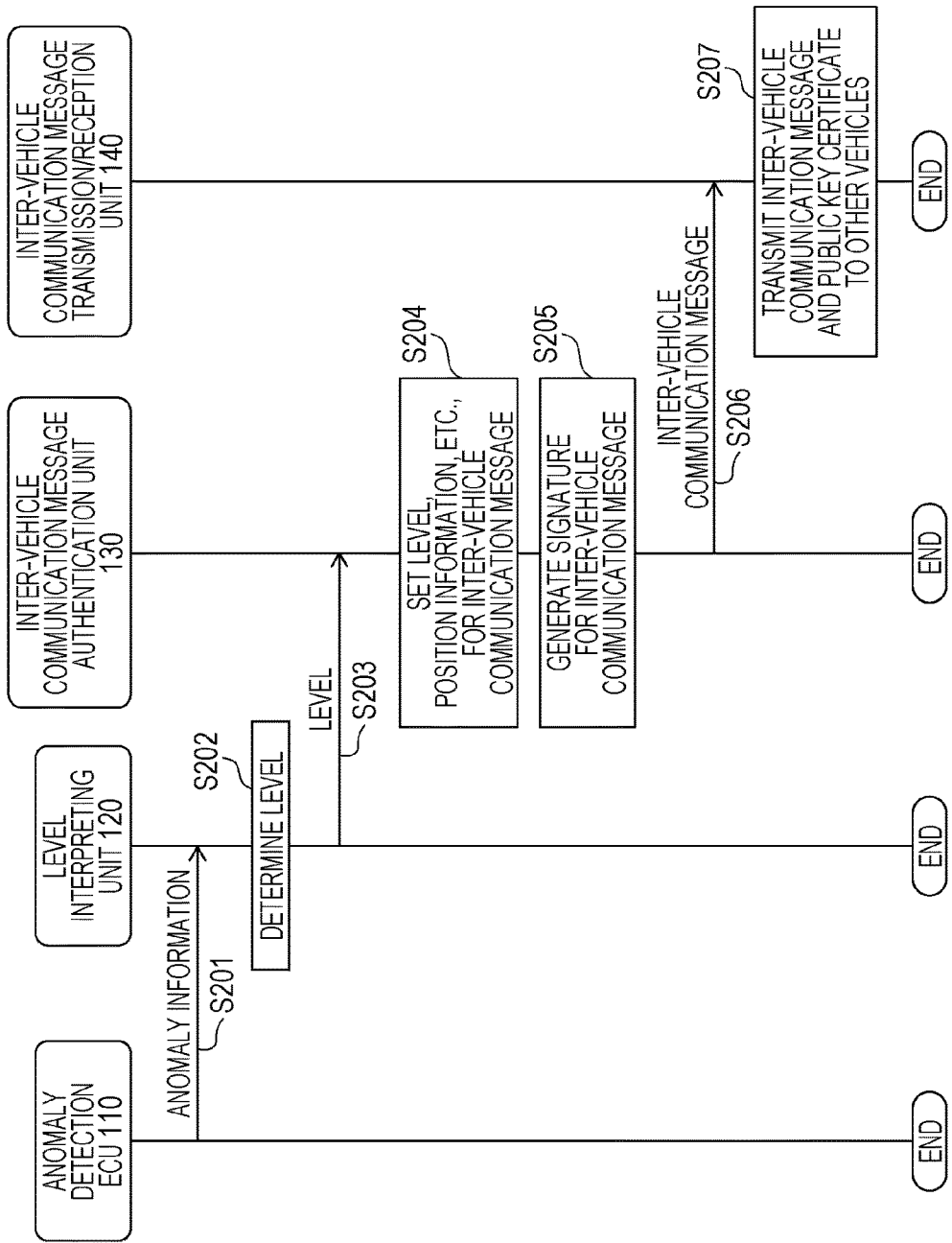

FIG. 16

| | | |
|---|---|---|
| COMMON APPLICATION HEADER PORTION | COMMON APPLICATION HEADER INFORMATION | 301 |
| COMMON APPLICATION DATA PORTION | CLOCK TIME INFORMATION | 302 |
| | POSITION INFORMATION | 303 |
| | VEHICLE STATE INFORMATION | 304 |
| | VEHICLE ATTRIBUTES INFORMATION | 305 |
| FREE APPLICATION HEADER PORTION | FREE APPLICATION HEADER INFORMATION | 306 |
| FREE APPLICATION DATA PORTION | LEVEL INFORMATION | 307 |
| | RESET LEVEL INFORMATION | 311 |
| | LEVEL CHANGING CONDITIONS | 312 |
| | UNAUTHORIZED VEHICLE POSITION INFORMATION | 308 |
| | CONDITION INFORMATION (TRANSFER CONDITION: LESS THAN 500 m) | 310 |
| | SIGNATURE DATA | 309 |

| DISTANCE TO UNAUTHORIZED VEHICLE | CONTENT OF LEVEL CHANGE |
|---|---|
| DISTANCE TO UNAUTHORIZED VEHICLE < 100 m | MAINTAIN LEVEL SET AT TIME OF DETECTING ANOMALY (LEVEL OF LEVEL INFORMATION) |
| 100 m ≤ DISTANCE TO UNAUTHORIZED VEHICLE < 300 m | LOWER LEVEL BY 1 FROM LEVEL SET AT TIME OF DETECTING ANOMALY (DECREMENT LEVEL OF LEVEL INFORMATION BY 1) |
| 300 m ≤ DISTANCE TO UNAUTHORIZED VEHICLE < 500 m | LOWER LEVEL BY 2 FROM LEVEL SET AT TIME OF DETECTING ANOMALY (DECREMENT LEVEL OF LEVEL INFORMATION BY 2) |

| | | |
|---|---|---|
| COMMON APPLICATION HEADER PORTION | COMMON APPLICATION HEADER INFORMATION | 301 |
| COMMON APPLICATION DATA PORTION | CLOCK TIME INFORMATION | 302 |
| | POSITION INFORMATION | 303 |
| | VEHICLE STATE INFORMATION | 304 |
| | VEHICLE ATTRIBUTES INFORMATION | 305 |
| FREE APPLICATION HEADER PORTION | FREE APPLICATION HEADER INFORMATION | 306 |
| FREE APPLICATION DATA PORTION | LEVEL INFORMATION | 307 |
| | COUNT INFORMATION | 391 |
| | CONDITIONS INFORMATION (TRANSFER CONDITION: LESS THAN 2 TIMES) | 392 |
| | SIGNATURE DATA | 309 |

390a

METHOD FOR HANDLING CASE OF DETECTING UNAUTHORIZED FRAME TRANSMITTED OVER ONBOARD NETWORK

BACKGROUND

1. Technical Field

The present disclosure relates to technology to handle an unauthorized frame in a case of having detected an unauthorized frame transmitted in an onboard network where an electronic control unit performs communication.

2. Description of the Related Art

In recent years, a great number of electronic control units (ECU) have been placed in systems in automobiles. A network connecting these ECUs is referred to as an onboard network. Many standards exist for onboard networks. The most mainstream of these is a standard called CAN (Controller Area Network), that is stipulated in ISO11898-1.

A CAN is configured using two busses, and each ECU connected to the buses is called a node. Each node connected to a bus transmits/receives messages called frames. A transmitting node that transmits a frame applies voltage to the two busses, and generates potential difference between the busses, thereby transmitting a value "1" called recessive, and a value "0" called dominant. In a case where multiple transmitting nodes transmit recessive and dominant at exactly the same timing, the dominant is transmitted with priority. In a case where there is an abnormality in the format a received frame, a receiving node transmits a frame called an error frame. An error frame is a continuous transmission of six bits, thereby notifying the transmitting node and other receiving nodes that there is a frame abnormality.

No identifiers indicating the transmission destination or transmission source exist in CAN, with the transmitting node attaching an ID called a message ID to each frame and transmitting (i.e., sending out signals to the bus), and the receiving nodes only receiving frames of a predetermined message ID (i.e., reading signals from the bus). The CSMA/CA (Carrier Sense Multiple Access/Collision Avoidance) format is employed, so when multiple nodes transmit at the same time, arbitration by message ID is performed, with frames having a smaller message ID value being transmitted with higher priority.

Now, there is a risk of an unauthorized ECU transmitting an unauthorized message on the bus, and unauthorizedly controlling the vehicle in which the onboard network is installed. In a case where one vehicle is unauthorizedly controlled, an accident may occur such as a collision involving other vehicles nearby.

Also, in recent years, automobiles have come to exchange information with various devices and the like over networks, in what is called connected cars. For example, using inter-vehicle communication where information is exchanged among vehicles proactively prevents accidents, and enables realization of a safer traffic system. A system that distinguishes whether or not a moving object situated near its the vehicle in which it is installed is a danger factor, and notifies other vehicles, is known as a technology using an inter-vehicle communication system (see Japanese Unexamined Patent Application Publication No. 2007-310457). While this technology distinguishes whether or not a moving object situated near a vehicle is a danger factor, it does not notify vehicles following behind of abnormalities within the vehicle. However, in a case where the vehicle is unauthorizedly controlled within the vehicle, an accident such as a collision or the like may occur.

SUMMARY

One non-limiting and exemplary embodiment provides an anomaly handling method where, in a case where the possibility that a vehicle is going to be unauthorizedly controlled is high, this is suitably handled to suppress the effects thereof. The present disclosure also provides an electronic control unit (ECU) that, in a case where the possibility is high that a vehicle is going to be unauthorizedly controlled, suitably handles this.

In one general aspect, the techniques disclosed here feature an anomaly handling method used in one or a plurality of electronic control units installed in one vehicle, wherein, when an unauthorized frame is detected by an onboard network installed in another vehicle, an anomaly detection notification transmitted from a device installed in the other vehicle is received, and wherein an anomaly handling processing is selected from a plurality of predetermined anomaly handling processing in accordance with a content of the anomaly detection notification that has been received, and the selected anomaly handling processing is executed.

According to the present disclosure, in a case where an unauthorized frame is detected in an onboard network of one vehicle, other vehicles are notified to that effect, so even in a case where one vehicle is unauthorizedly controlled, effects on other vehicles nearby the one vehicle can be suppressed.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating level information, according to the first embodiment;

FIG. 8 is a diagram illustrating an example of the configuration of an inter-vehicle communication message according to the first embodiment;

FIG. 9 is a sequence diagram illustrating operations of each part of a vehicle at the time of anomaly detection, according to the first embodiment;

FIG. 16 is a diagram illustrating an example of the configuration of an inter-vehicle communication message according to a third embodiment;

FIG. 17 is a diagram illustrating level changing conditions according to the third embodiment;

FIG. 23 is a diagram illustrating an example of the configuration of an inter-vehicle communication message according to a fifth embodiment.

DETAILED DESCRIPTION

Figure 1:
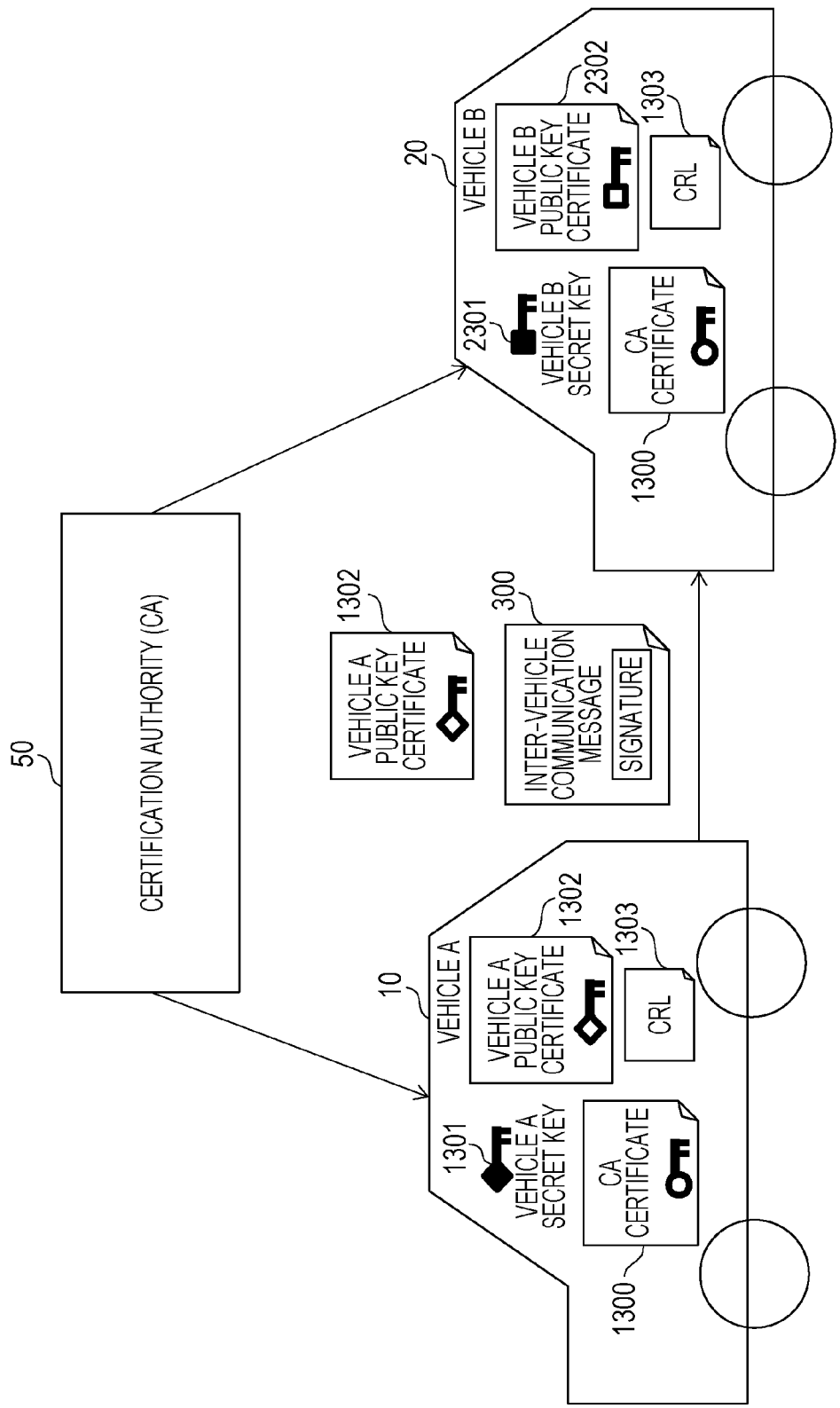
FIG. 1 is a diagram illustrating the overall configuration of an inter-vehicle communication system according to a first embodiment.

An anomaly handling method according to an aspect of the present disclosure is an anomaly handling method used in one or a plurality of electronic control units installed in one vehicle. When an unauthorized frame is detected by an onboard network installed in another vehicle, an anomaly detection notification transmitted from a device installed in the other vehicle is received. An anomaly handling processing is selected from a plurality of predetermined anomaly handling processing in accordance with a content of the anomaly detection notification that has been received, and the selected anomaly handling processing is executed. Accordingly, at the one vehicle, in a case where an unauthorized frame is detected in an onboard network of another vehicle, notification to that effect can be received, and the effects of another vehicle being unauthorizedly controlled, for example, can be reduced by anomaly handling processing.

The anomaly detection notification may include level information indicating one of a plurality of levels, and the selection of anomaly handling processing may be performed in accordance with the level that the level information included in the received anomaly detection notification indicates. Accordingly, level information can be set at another vehicle in accordance with anomaly handling processing so appropriate handling can be performed at the one vehicle in a case where there is a possibility that another vehicle will be unauthorizedly controlled.

The selection of anomaly handling processing may be performed by referencing handling information where anomaly handling processing has been correlated with each of the plurality of levels, and may be selection of anomaly handling processing corresponding to the handling information by the level indicated by the level information included in the anomaly detection notification that has been received. Accordingly, by appropriately setting the level and the content of the anomaly handling processing as handling information, appropriate handling can be performed at the one vehicle in a case where there is a possibility that another vehicle will be unauthorizedly controlled.

Each anomaly handling processing where the handling information is correlated with one or more of the plurality of levels may include at least one of control to stop traveling of the one vehicle, control to cause the vehicle to proceed slowly, control for the vehicle to maintain inter-vehicle distance as to a vehicle ahead within a certain range, and control to notify the driver of the vehicle. Accordingly, the one vehicle can be transitioned to a safe state in a case where there is a possibility that another vehicle will be unauthorizedly controlled, which can suppress occurrence of accidents including multiple vehicles, for example.

Determination may further be made regarding whether or not a predetermined condition has been satisfied based on contents of the received anomaly detection notification. In a case where the predetermined condition has been satisfied, the anomaly detection notification may be transmitted externally from the one vehicle, and in a case where the predetermined condition has not been satisfied, the anomaly detection notification may not be transmitted. Accordingly, an anomaly detection notification may be transferred under certain conditions, so the anomaly detection notification can be transmitted over a rather broad range (vehicles traveling through that range) even through the transmission output used is relatively small in the inter-vehicle communication among individual vehicles, for example. Vehicles to which the anomaly detection notification has been transmitted can perform handling such as transitioning to a safe state, for example. The transfer is performed conditionally, so usage can be realized where conditions are set such that the transfer is not performed over an unnecessarily broad range.

The anomaly detection notification may include condition information indicating a condition for transfer. In a case where the condition for transfer that the condition information included in the received anomaly detection notification indicates has been satisfied, the determination may performed with the predetermined condition having been satisfied, and in a case where the condition for transfer that the condition information indicates has not been satisfied, the determination may be performed with the predetermined condition not having been satisfied. Accordingly, a vehicle that transmits an anomaly detection notification, for example, can set the transfer conditions for the anomaly detection notification.

The anomaly detection notification may include position information indicating a position measured regarding the other vehicle in which is installed the device that has detected the unauthorized frame and transmitted the anomaly detection notification, the predetermined condition being a condition that the position measured regarding the one vehicle and the position indicated by the position information included in the anomaly detection notification that has been received are within a predetermined range. Also, the anomaly detection notification may include count information indicating a count, the predetermined condition being a condition that a count of transfer performed from the device that has detected the unauthorized frame and transmitted the anomaly detection notification until receiving the anomaly detection notification therefrom is smaller than a predetermined count, wherein the determination is made regarding whether or not the predetermined condition has been satisfied, based on the count information included in the received anomaly detection notification, and wherein the transmission is performed upon having updated the count information included in the anomaly detection notification at the time of transmitting the received anomaly detection notification. Also, the anomaly detection notification may include clock time information indicating clock time, the predetermined condition being a condition that the elapsed time from a clock time indicated by the clock time information included in the received anomaly detection notification is shorter than a predetermined time. According to these, the anomaly detection notification can be transmitted from the vehicle where the anomaly has been detected to a range restricted to a certain level, thereby preventing trouble due to vehicles that are sufficiently distanced from performing anomaly handling processing (traffic congestion occurring due to stopping or proceeding slowly as anomaly handling processing, for example). That is to say, only vehicles within a certain range from the vehicle regarding which the anomaly has been detected can be transitioned to a safe state for example, rather than performing anomaly handling processing to bring all vehicles to a safe state, and effects on the traffic system (occurrence of traffic congestion, etc.) can be suppressed.

At the time of the transmission of the received anomaly detection notification, the transmission may performed upon having updated the level information included in the anomaly detection notification based on a predetermined level changing rule. Accordingly, the anomaly handling processing is made to differ among the multiple vehicles in the perimeter of the vehicle regarding which the anomaly has been detected. Thus, the level may be set lower the farther away from the vehicle regarding which the anomaly has been detected, etc., for example, and the lower the level is accordingly, the degree of the anomaly handling processing may be changed from stooping to proceeding slowly, from proceeding slowly to driving while maintaining a certain inter-vehicle distance, and so forth, for example, so that adverse effects on the traffic system are smaller.

An anomaly handling method according to an aspect of the present disclosure is an anomaly handling method that handles unauthorized situations by performing communication among first and second vehicles. A device installed in the first vehicle transmits an anomaly detection notification at the time of an onboard network installed in the first vehicle detecting an unauthorized frame. One or a plurality of electronic control units installed in the second vehicle receive the anomaly detection notification, select anomaly handling processing from a plurality of predetermined anomaly handling processing determined beforehand in accordance with a content of the anomaly detection notification that has been received, and execute the selected anomaly handling processing. Accordingly, in a case where an unauthorized frame is detected in the onboard network of the first vehicle, handling can be performed by appropriate anomaly handling processing at the second vehicle.

When the unauthorized frame is detected, the device installed in the first vehicle may perform the transmission including in the anomaly detection notification level information indicating one level selected base on, of the plurality of levels predetermined by dividing frame IDs, the frame ID of the unauthorized frame. The one or plurality of electronic control units installed in the second vehicle may perform the selection of anomaly handling processing in accordance with the level indicated by the level information included in the anomaly detection notification that has been received. Accordingly, the level information can be set for each function type where functions have been classified. Accordingly, the frame IDs can be divided into function types in the onboard network, and anomaly handling processing can be executed in accordance with the degree of effect occurring from the unauthorized frame (different effects for each division). Examples of function types include drive-related functions, chassis-related functions, body-related functions, safety/comfort functions, ITS (Intelligent Transport Systems)-related functions, telematics-related functions, infotainment-related functions, and so forth.

An anomaly handling method according to an aspect of the present disclosure is an anomaly handling method used by an electronic control unit connected to an onboard network installed in one vehicle, wherein an anomaly detection notification is transmitted to another vehicle in a case of having detected an unauthorized frame by the vehicle network installed in the one vehicle. Accordingly, other vehicles can know that the possibility that the one vehicle will be unauthorizedly controlled has risen a certain degree (i.e., that an unauthorized frame has been detected).

An electronic control unit (ECU) according to an aspect of the present disclosure is an electronic control unit including: a processor; and memory having a program stored therein, the program causing the processor to execute operations including receiving an anomaly detection notification transmitted from a device installed in an onboard network installed in a vehicle different from a vehicle in which the own unit is installed, when the onboard network detects an unauthorized frame, and selecting anomaly handling processing to execute from a predetermined plurality of anomaly handling processing in accordance with a content of the received anomaly detection notification, and executing the selected anomaly handling processing. A vehicle in which this ECU is installed can handle an unauthorized frame having been detected at another vehicle.

An electronic control unit (ECU) according to an aspect of the present disclosure is an electronic control unit connected to an onboard network, the electronic control unit including: a processor; and memory having a program stored therein, the program causing the processor to execute operations including detecting unauthorized frames transmitted in the onboard network, and transmitting an anomaly detection notification to a different vehicle from the vehicle in which is installed the own unit, in a case where an unauthorized frame is detected. Accordingly, in a case of having detected an unauthorized frame, this can be conveyed to other vehicles, and accordingly handling can be performed at other vehicles.

These general or specific aspects may be realized by a system, method, integrated circuit, computer program, or computer-readable recording medium such as a CD-ROM or the like, and may be realized by any combination of a system, method, integrated circuit, computer program, and recording medium.

The following is a detailed description of an inter-vehicle communication system used in an anomaly handling method according to embodiments. Note that the embodiments described below are all specific examples of the present disclosure. Accordingly, values, components, placements and connected states of components, steps (processes) and the order of steps, and so forth illustrated in the following embodiments, are only exemplary, and do not restrict the present disclosure. Components in the following embodiments which are not included in an independent Claim are optional components. The drawings are all schematic diagrams and are not necessarily created in an exact manner.

First Embodiment

As an embodiment of the present disclosure, description will be made below with reference to the drawings regarding an inter-vehicle communication system where, in a case of detecting an unauthorized frame (unauthorized CAN message) sent out onto a bus in an onboard network system in which multiple onboard ECUs communicate over the bus, notification is made from that vehicle by inter-vehicle communication to vehicles following behind. The vehicles following behind execute anomaly handling processing so that the vehicle is in a safe state, in accordance with the contents received by the inter-vehicle communication.

1.1 Overall Configuration of Inter-Vehicle Communication System

FIG. 1 is a diagram illustrating the overall configuration of the inter-vehicle communication system. The inter-vehicle communication system is configured including a vehicle 10 (vehicle A), a vehicle 20 (vehicle B), and a certification authority 50.

The inter-vehicle communication system here uses a Public Key Infrastructure (PKI). Each vehicle stores a secret key and a public key certificate for use in inter-vehicle communication. The public key certificate includes an electronic signature given by the certification authority 50 (CA) that is a trusted third party entity, as a certification of the owner of the public key that makes up a pair with the secret key. Although one certification authority 50 is illustrated in FIG. 1, there may be multiple certification authorities having a hierarchical relationship. A CA certificate 1300 includes the public key of the certification authority 50.

The vehicle 10 (vehicle A) stores a vehicle A secret key 1301, a vehicle A public key certificate 1302, the CA certificate 1300, and a Certificate Revocation List (CRL) 1303.

The vehicle 20 (vehicle B) stores a vehicle B secret key 2301, a vehicle B public key certificate 2302, the CA certificate 1300, and a CRL 1303. The vehicle A public key certificate 1302 and vehicle B public key certificate 2302 are both given an electronic signature using a secret key (omitted from illustration) of the certification authority 50, and distributed from the certification authority 50. Recording of the public key certificate, secret key, etc., to the vehicles (e.g., writing to an ECU installed in the vehicle) may be performed at any of the manufacturing stage of the vehicle, the shipping stage thereof, the manufacturing stage of the ECU to be installed in the vehicle, or the like. The CRL 1303 is issued from the certification authority 50, and is a list of identification information of public key certificates that should be revoked.

An inter-vehicle communication message 300 transmitted from vehicle A to vehicle B by inter-vehicle communication is signed using the vehicle A secret key 1301. For example, the vehicle 10 (vehicle A) is traveling, and the vehicle 20 (vehicle B) is traveling following behind. Although description will be made assuming that the vehicle 10 is performing wireless communication using a transmission antenna (omitted from illustration) having backwards-facing directivity, inter-vehicle communication may be performed using other communication methods, as long as a vehicle behind the vehicle 10 by at least a normal inter-vehicle distance can receive. Note that the frequency band used for inter-vehicle communication differs depending on the country. As one example, 700 MHz is used in japan, and a 5.9 GHz band is used in the USA and Europe. However, the inter-vehicle communication according to the present embodiment can be realized technologically without being restricted to wireless communication using these frequency bands.

In a case where the vehicle 10 (vehicle A) transmits an inter-vehicle message to the vehicle 20 (vehicle B), the inter-vehicle communication message 300 and vehicle A public key certificate 1302 are transmitted. The vehicle 20 uses the public key of the CA certificate 1300 to verify the signature of the vehicle A public key certificate 1302 that has been received, and then uses the public key of the vehicle A included in the vehicle A public key certificate to verify the signature of the inter-vehicle communication message 300. In a case of having detected an unauthorized CAN message, the vehicle 10 (vehicle A) transmits an inter-vehicle communication message 300 as an anomaly detection notification. An anomaly detection notification is a notification for performing inter-vehicle transmission to the effect that an anomaly has been detected, and the inter-vehicle communication message 300 serving as the anomaly detection notification is an inter-vehicle communication message including information relating to anomaly detection.

1.2 Configuration of Vehicle

Figure 2:
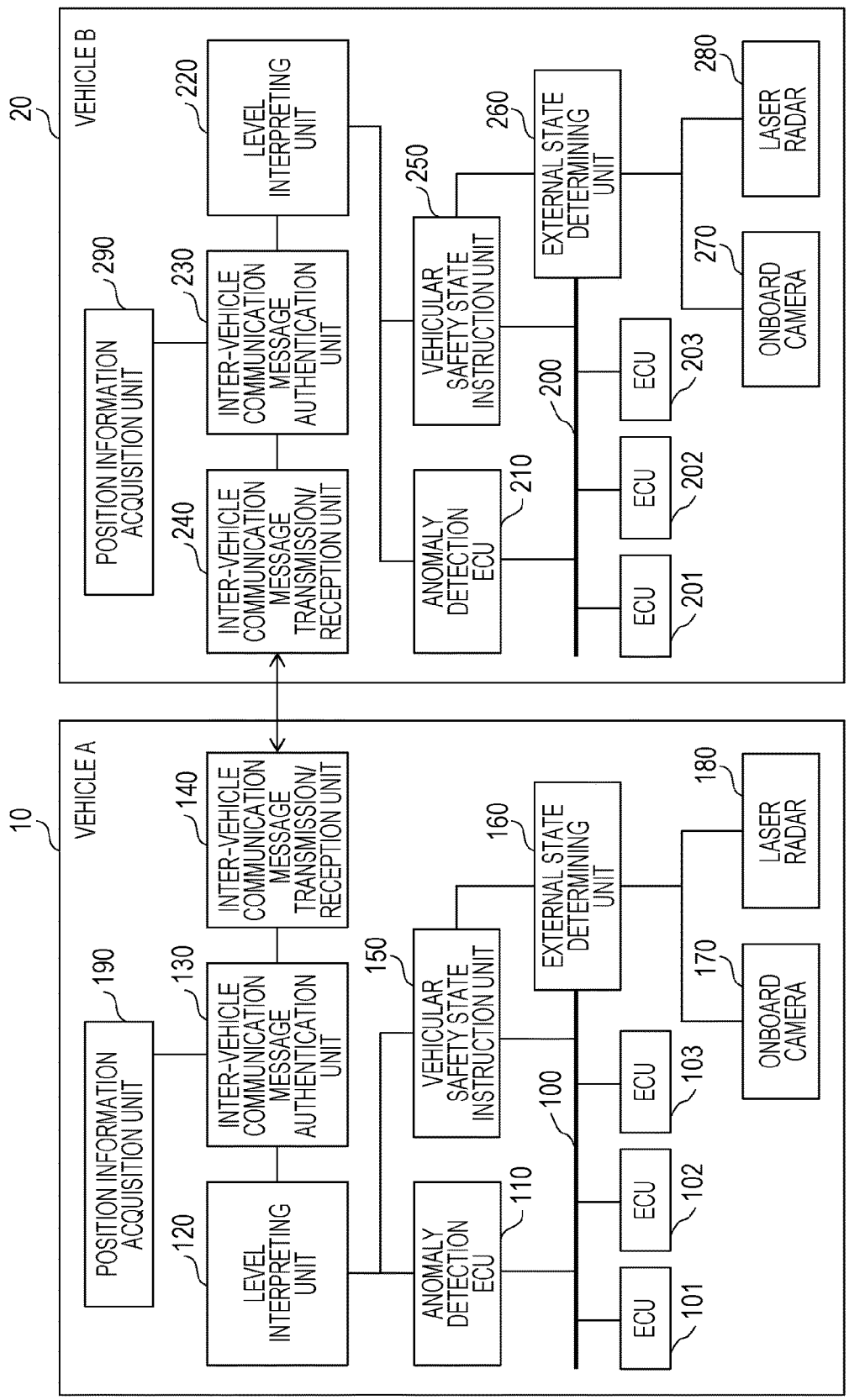
FIG. 2 is a diagram illustrating the configuration of a vehicle according to the first embodiment.

FIG. 2 is a diagram illustrating the configuration of the vehicle 10 (vehicle A) and the vehicle 20 (vehicle B). The vehicle 10 includes a CAN bus 100, ECUs 101, 102, and 103, an anomaly detection ECU 110, a level interpreting unit 120, an inter-vehicle communication message authentication unit 130, an inter-vehicle communication message transmission/reception unit 140, a vehicular safety state instruction unit 150, an external state determining unit 160, an onboard camera 170, a laser radar 180, and a position information acquisition unit 190.

The CAN bus 100 is a communication path in the onboard network, and is a bus (signal line) used to exchange frames (CAN messages) among multiple ECUs following the CAN protocol. Although FIG. 2 illustrates one bus for sake of convenience, multiple busses may be included, and an ECU having gateway functions, for example, may transfer CAN message among multiple busses.

The ECUs 101 through 103 are connected to the CAN bus 100. The ECUs 101 through 103 may also be connected to various types of devices such as sensors, actuators, or the like (omitted from illustration), and may, for example, acquire the state of devices connected thereto and transmit data frames representing the state over the CAN bus 100, or receive data frames to which certain CAN message IDs have been attached in accordance with an individually-stored reception ID list (a list listing CAN message IDs to be received), and control the devices connected thereto following the content thereof. An ECU is a device that includes, for example, digital circuits such as a processor (microprocessor), memory, and so forth, analog circuits, communication circuits, and so forth. The memory is ROM, RAM, and so forth, capable of storing a control program (computer program) to be executed by the processor. The functions of the ECU are realized by the processor operating following the control program (computer program), for example. A computer program is configured as a combination of multiple command codes representing instructions to the processor, to achieve predetermined functions. Although only the three ECUs 101, 102, and 103 are illustrated in FIG. 2 for sake of convenience, many ECUs are included in the vehicle 10, and communicate with each other over the CAN bus 100. These ECUs are each classified into one of multiple function types (described later).

The anomaly detection ECU 110 is a type of ECU, that monitors frames (CAN message) flowing over the CAN bus 100 for anomalies, and in a case of having detected an anomaly, notifies the level interpreting unit 120 of anomaly information indicating the content of the anomaly detection. There is a possibility that an unauthorized ECU, for example, may be connected to the CAN bus 100 and transmit unauthorized CAN messages. The anomaly detection ECU 110 performs inspection following rules indicated by a predetermined whitelist (described later), where CAN message appearing on the bus are determined regarding whether or not an unauthorized can message not conforming to the rules.

The level interpreting unit 120 references the anomaly information indicating the content of the anomaly detection, determines level information indicating a security level to be included in an inter-vehicle communication message in a case of transmitting an inter-vehicle communication message for anomaly detection notification, and notifies the inter-vehicle communication message authentication unit 130 thereof. The security level is determined by differentiation according to each function type of CAN message detected as an anomaly (described in detail later with reference to FIG. 7). The level interpreting unit 120 also notifies the vehicular safety state instruction unit 150 of instructions (execution instructions for anomaly handling processing) to transition to a safe state in accordance with the security level indicated by level information included in an inter-vehicle communication message received from another car (another vehicle), based on predetermined handling information (safety state list). The anomaly handling processing is control that the vehicular safety state instruction unit 150 performs, to transition to a sate state. The anomaly handling processing includes anomaly handling processing for control to stop the vehicle from running, anomaly handling processing for control to cause the vehicle to proceed slowly, anomaly handling processing for control to cause the vehicle to travel with a predetermined distance between itself and a vehicle ahead, anomaly handling processing for control to notify the driver of the vehicle, and so forth.

When transmitting an inter-vehicle communication message 300, the inter-vehicle communication message authentication unit 130 forms the inter-vehicle communication message 300 including level information acquired from the level interpreting unit 120 and position information of the vehicle acquired from the position information acquisition unit 190 and so forth, and generates a signature using the secret key of the vehicle and includes this in the inter-vehicle communication message 300. The inter-vehicle communication message authentication unit 130 also performs signature verification regarding inter-vehicle communication messages received from other vehicles, and notifies the level interpreting unit 120 of level information included in the inter-vehicle communication messages.

The inter-vehicle communication message transmission/reception unit 140 transmits inter-vehicle communication messages to other vehicles, and receives inter-vehicle communication messages from other vehicles.

The vehicular safety state instruction unit 150 executes anomaly handling processing upon having received an instruction from the level interpreting unit 120 (execution instruction for anomaly handling processing) in accordance with the security level indicated by the level information in an inter-vehicle communication message received from another vehicle, thereby giving the parts (the ECUs and so forth) within the vehicle instructions to stop the vehicle from running, instructions to proceed slowly, instructions to travel with a predetermined distance between this vehicle and a vehicle ahead, and instructions to notify the driver of the vehicle. These instructions are given using information notified from the external state determining unit 160, and for example are given by transmitting CAN messages stipulated beforehand for control over the CAN bus 100.

The external state determining unit 160 analyzes information acquired from various types of sensors installed in the vehicle, such as the onboard camera 170, laser radar 180, and so forth, and notifies the vehicular safety state instruction unit 150 of information whereby the vehicle can be appropriately transitioned to a safe state, while judging the situation nearby its own vehicle. For example, lane markings may be detected by the onboard camera and surrounding objects detected by the laser radar, thereby notifying information to appropriately realize pulling the vehicle over to the shoulder and stopping, proceeding slowly, traveling with a predetermined distance as to a vehicle ahead, and so forth.

The position information acquisition unit 190 is realized by a Global Positioning System (GPS) receiver for example, acquires position information of the vehicle such as latitude, longitude, altitude, and so forth, and notifies the inter-vehicle communication message authentication unit 130.

Note that the level interpreting unit 120, inter-vehicle communication message authentication unit 130, inter-vehicle communication message transmission/reception unit 140, vehicular safety state instruction unit 150, and external state determining unit 160 are realized by one or multiple devices (ECUs) configured of electronic circuitry. Although FIG. 2 illustrates the vehicular safety state instruction unit 150 and external state determining unit 160 being connected to the CAN bus 100, an arrangement may be made where one or multiple devices realizing the vehicular safety state instruction unit 150 and external state determining unit 160 are not directly connected to the CAN bus 100 but rather give the CAN bus 100 instructions via an ECU connected to the CAN bus 100, and receive information from the CAN bus 100 thereby.

The vehicle 20 also has the same configuration as the vehicle 10, being configured including a CAN bus 200, ECUs 201, 202, and 203, an anomaly detection ECU 210, a level interpreting unit 220, an inter-vehicle communication message authentication unit 230, an inter-vehicle communication message transmission/reception unit 240, a vehicular safety state instruction unit 250, a external state determining unit 260, an onboard camera 270, a laser radar 280, and a position information acquisition unit 290. Components which are the same in FIG. 2 have different reference numerals but are assigned the same names.

1.3 Data Frame Format

Figure 3:
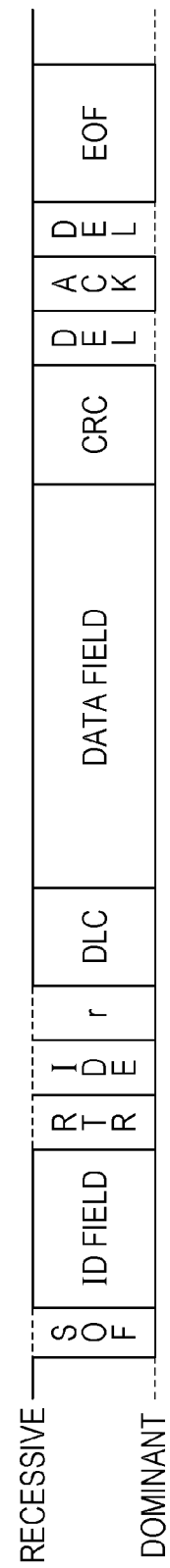
FIG. 3 is a diagram illustrating a format of a data frame stipulated by the CAN protocol.

The following is a description of a data frame which is a type of frame (CAN message) used on a network according to the CAN protocol. FIG. 3 is a diagram illustrating a format of a data frame stipulated by the CAN protocol. FIG. 3 illustrates a data frame according to a standard ID format stipulated in the CAN protocol. A data frame is configured including the fields of a Start Of Frame (SOF), ID field, Remote Transmission Request (RTR), Identifier Extension (IDE), reserved bit "r", Data Length Code (DLC), data field, Cyclic Redundancy Check (CRC) sequence, CRC delimiter "DEL", ACK (Acknowledgement) slot, ACK delimiter "DEL", and End Of Frame (EOF).

The SOF is made up of 1-bit dominant. The state of the bus is recessive when idle, and start of transmission of a frame is notified by being changed to dominant by the SOF.

The ID field is made up of 11 bits, and is a field storing an ID (CAN message ID) that is a value indicating the type of data. Design has been implemented so that in a case where multiple nodes start transmission at the same time, frames with smaller ID values are given higher priority, in order to perform communication arbitration using this ID field.

The RTR is a value identifying a data frame and remote frame, and is made up of 1-bit dominant in a data frame.

The IDE and "r" are each made up of 1-bit dominant.

The DLC is made up of four bits, and is a value indicating the length of the data field. Note that the IDE, r, and DLC are collectively referred to as a control field.

The data field is a maximum of 64 bits, and is a value indicating the content of the data being transmitted. The length can be adjusted in 8-bit increments. The CAN protocol does not stipulate the specification of data being transmitted; that is set at the onboard network system 10. Accordingly, the specification is dependent on the model, manufacturer (manufacturing maker), or the like.

The CRC sequence is made up of 15 bits. This is calculated from the transmitted values of the SOF, ID field, control field, and data field.

The CRC delimiter is made up of 1-bit recessive, and is a sectioning symbol representing the end of the CRC sequence. The CRC sequence and CRC delimiter are collectively referred to as the CRC field.

The ACK slot is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominance after transmission, so the transmitting node will be able to confirm that one of the receiving nodes has succeeded in reception of the ACK slot is dominant after transmission.

The ACK delimiter is made up of 1-bit recessive, and is a sectioning symbol representing the end of the ACK.

The EOF is made up of 7-bit recessive, and represents the end of the data frame.

1.4 Configuration of Anomaly Detection ECU 110

Figures 4, 5:
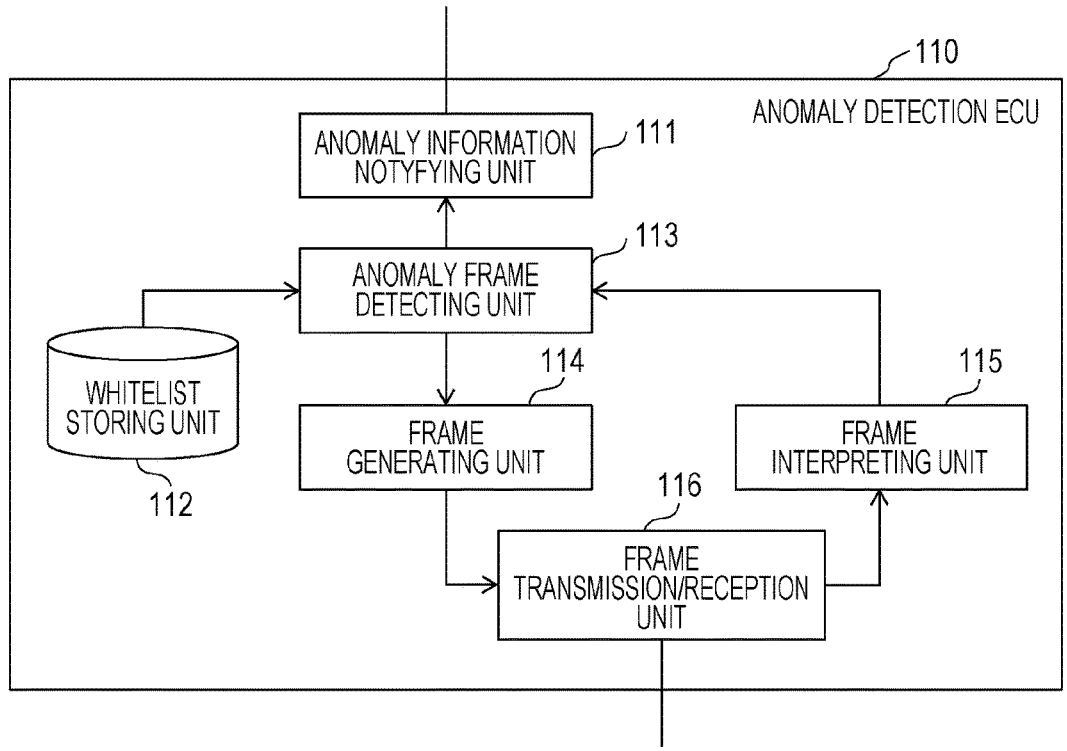
FIG. 4 is a configuration diagram of an anomaly detection ECU according to the first embodiment.
FIG. 5 is a diagram illustrating an example of a whitelist stored by the anomaly detection ECU according to the first embodiment.

FIG. 4 is a configuration diagram of the anomaly detection ECU 110. The anomaly detection ECU 110 is configured including a frame transmission/reception unit 116, a frame interpreting unit 115, an anomaly frame detecting unit 113, a whitelist storing unit 112, a frame generating unit 114, and an anomaly information notifying unit 111. These components are functional components, and the functions thereof are realized by a communication circuit in the anomaly detection ECU 110, a processor or digital circuit or the like that executes a control program stored in memory, and so forth.

The frame transmission/reception unit 116 transmits and receives frames (CAN messages) following the CAN protocol to and from the CAN bus 100. That is to say, the frame transmission/reception unit 116 receives frames from the CAN bus 100 one bit at a time, and transfers to the frame interpreting unit 115. The contents of frames that have been notified by the frame generating unit 114 are also transmitted to the CAN bus 100.

The frame interpreting unit 115 receives values of frames from the frame transmission/reception unit 116, and performs interpretation so as to map to each field in a frame format stipulated by the CAN protocol. A value that is determined to be an ID field is transferred to the anomaly frame detecting unit 113. In a case where determination is made that a frame is not following the CAN protocol, notification is made to the frame generating unit 114 to transmit an error frame. In a case of having received an error frame, i.e., in a case of having interpreted that a received frame is an error frame from the value thereof, the rest of the frame is discarded, i.e., interpreting of the frame is canceled.

The frame generating unit 114 configures an error frame following the notification instructing transmission of an error frame that has been notified from the frame interpreting unit 115, and notifies the frame transmission/reception unit 116 of the error frame and causes transmission thereof. The frame generating unit 114 configures an error frame following the notification instructing transmission of an error frame that has been notified from the anomaly frame detecting unit 113, and notifies the frame transmission/reception unit 116 of the error frame and causes transmission thereof.

The whitelist storing unit 112 stores a whitelist (see FIG. 5) stipulating CAN message IDs included in a valid frame transmitted over the CAN bus 100. The whitelist also includes conditions used to determine whether or not CAN messages are unauthorized, for each CAN message ID.

The anomaly frame detecting unit 113 has a function of determining whether or not a frame acquired from the CAN bus 100 is unauthorized or not, based on rules identified by the whitelist that the whitelist storing unit 112 stores. Specifically, the anomaly frame detecting unit 113 receives the value (CAN message ID) of the ID field notified from the frame interpreting unit 115, and in a case where the CAN message ID is not in the whitelist or does not satisfy conditions set in the whitelist corresponding to that CAN message ID, determines that this is unauthorized and notifies the frame generating unit 114 to transmit an error frame. Note that in this case, the bit values of the CAN message determined to be unauthorized are overwritten by the error frame made up of consecutive dominants being given priority over recessives. The anomaly frame detecting unit 113 notifies the anomaly information notifying unit 111 of the contents of the anomaly detection, that are the contents of the CAN message determined to be unauthorized (unauthorized frame). The anomaly information notifying unit 111 notifies the level interpreting unit 120 of anomaly information indicating the content of the anomaly detection.

1.5 Whitelist

FIG. 5 is a diagram illustrating an example of a whitelist that the whitelist storing unit 112 within the anomaly detection ECU 110 stores. The whitelist 1120 is data where data length 1122, data range 1123, and cycle 1124 have been correlated for each ID (CAN message ID) 1121.

The CAN message ID 1121 indicates valid CAN message IDs that have been determined to be permissible as a vehicle specification to be sent out onto the CAN bus 100 onto the onboard network.

The data length 1122 is the DLC (see FIG. 3), and indicates the valid data length determined by the specification for the CAN message of the corresponding CAN message ID.

The data range 1123 indicates the data range expected for the content of a valid data field determined by the specification for the CAN message of the corresponding CAN message ID.

The cycle 1124 indicates a valid cycle determined by the specification, in a case where the CAN message of the corresponding CAN message ID is a periodic message transmitted periodically.

The example in FIG. 5 illustrates that a CAN message of ID "0x100" relating to speed that satisfies the conditions of data length of eight bytes, data range of 0 through 180, and a cycle of 10 ms, is a valid CAN message. Also illustrated is that a CAN message of ID "0x200" relating to engine rotations that satisfies the conditions of data length of eight bytes, data range of 0 through 10000, and a cycle of 10 ms, is a valid CAN message. Also illustrated is that a CAN message of ID "0x300" relating to traveling distance that satisfies the conditions of data length of eight bytes, data range of 0 through 9999999, and a cycle of 20 ms, is a valid CAN message. Further illustrated is that a CAN message of ID "0x400" relating to door open/closed state that satisfies the conditions of data length of one byte, data range of 0 or 1, and a cycle of 1000 ms, is a valid CAN message. The anomaly detection ECU 110 determines that a CAN message that does not match the conditions for the CAN message IDs in the whitelist 1120 is an unauthorized CAN message.

1.6 Anomaly Detection Sequence

Figure 6:
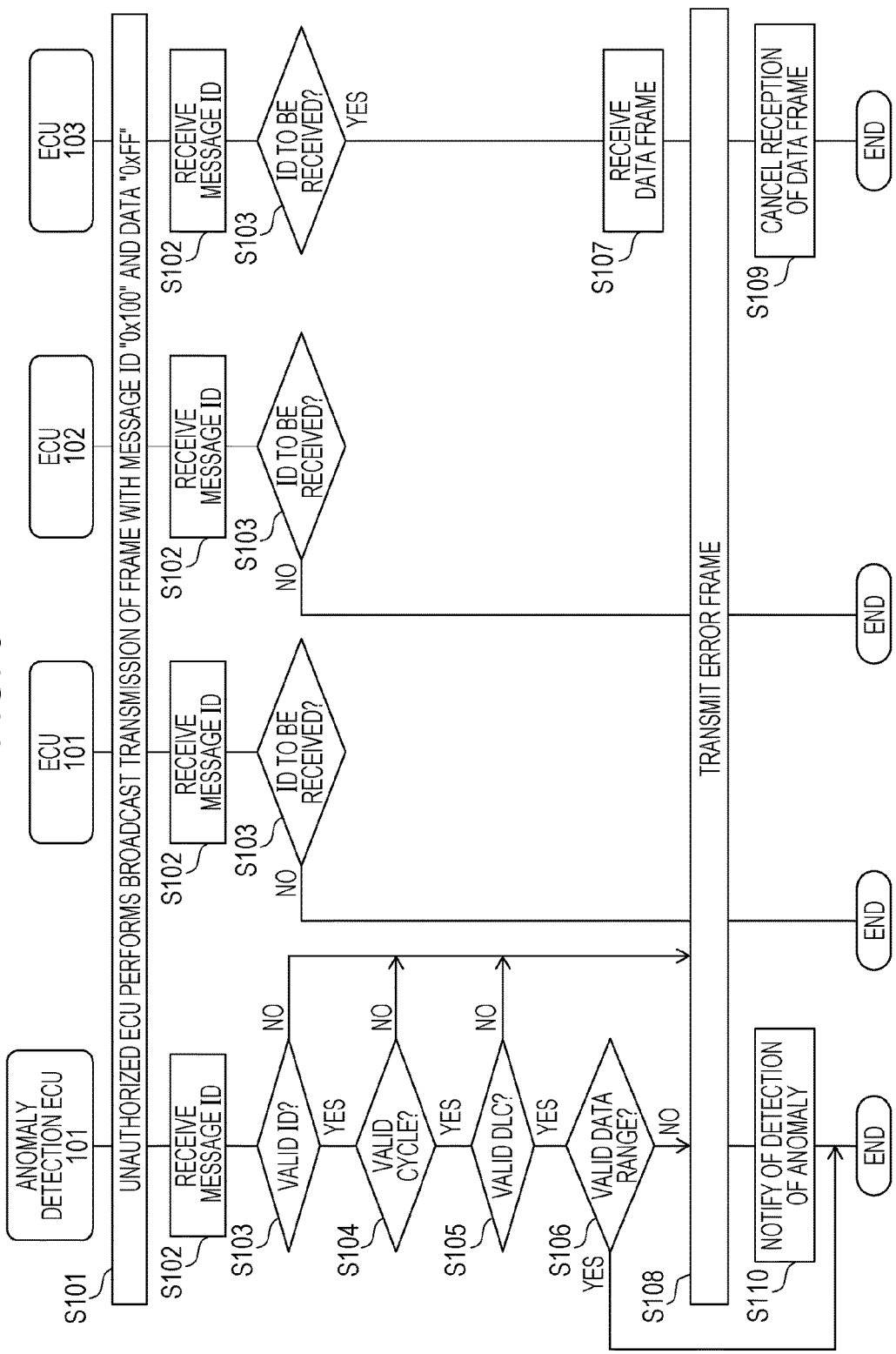
FIG. 6 is a sequence diagram illustrating an operation example relating to detection of an unauthorized frame, according to the first embodiment.

FIG. 6 is a sequence diagram illustrating an operation example of the anomaly detection ECU 110 detecting an unauthorized frame (i.e., an unauthorized CAN message). The sequences are illustrated by processing procedures (steps) at each device. The operations of the anomaly detection ECU 110 and the ECUs 101 through 103 in a case where an unauthorized ECU is connected to the CAN bus 100 and a frame (CAN message) where the CAN message ID is "0x100" and data is "255 (0xFF)" is transmitted will be described below with reference to FIG. 6.

First, the unauthorized ECU starts transmission of the data frame where the message ID is "0x100" and data is "255 (0xFF)" (step S101). The values of the bits making up the frame are sequentially sent out onto the CAN bus 100 in the order of SOF, ID field (message ID), and so forth, following the above-described data frame format.

When the unauthorized ECU has ended sending up to the ID field (CAN message ID) onto the CAN bus 100, the anomaly detection ECU 110 and the ECUs 101 through 103 each receive the CAN message ID (step S102).

The ECUs 101 through 103 each check whether or not a CAN message ID to receive, using the stored reception ID list, and the anomaly detection ECU 110 checks the CAN message ID to determine whether or not an unauthorized CAN message, using the whitelist (see FIG. 5) (step S103). In the example in FIG. 6, the ECU 101 and ECU 102 end reception, since "0x100" is not a CAN message ID to be received. The ECU 103 continues reception, since "0x100" is a CAN message ID to be received. The anomaly detection ECU 110 continues reception, since the CAN message ID "0x100" is in the whitelist.

The anomaly detection ECU 110 determines whether or not the CAN message that has appeared on the CAN bus 100 is being transmitted at the valid cycle that the whitelist indicates (step S104). In a case where this is not a valid cycle, the flow transitions to step S108 and error frame transmission is performed.

Next, the anomaly detection ECU 110 determines whether or not the CAN message that has appeared on the CAN bus 100 satisfies the valid data size (DLC) conditions that the whitelist indicates (step S105). In a case where this is not a valid data size, the flow transitions to step S108 and error frame transmission is performed.

Next, the anomaly detection ECU 110 determines whether or not the CAN message that has appeared on the CAN bus 100 satisfies the valid data range conditions that the whitelist indicates (step S106). In a case where the valid data range conditions are satisfied, the anomaly detection ECU 110 ends processing. In the example in FIG. 6, the received data is "255 (0xFF)" which is outside of the data range in the whitelist, so a frame generated toward broadcasting of an error frame (i.e., transmitting over the CAN bus 100).

While the anomaly detection ECU 110 determines whether or not the CAN message is unauthorized using the whitelist, the ECU 103 continues to receive the data frame (step S107).

In a case where the anomaly detection ECU 110 has determined that the CAN message is unauthorized from the distinguishing performed in steps S103 through S106, an error frame is broadcast (transmitted) (step S108). The ECU 103 receives this error frame, and cancels reception of the data frame (step S109).

The anomaly detection ECU 110 notifies anomaly information indicating the content of the CAN message determined to be unauthorized, to the level interpreting unit 120 (step S110).

1.7 Level Information

FIG. 7 illustrates an example of level information 1200 that the level interpreting unit 120 stores. The level information 1200 is information correlating a function type 1201, ID (CAN message ID) 1202, and level 1203.

The function type 1201 indicates a function type determined by classifying the function of the ECU transmitting the CAN message. Examples of classification of ECU functions include drive-related functions, chassis-related functions, body-related functions, safety/comfort functions, ITS-related functions, telematics-related functions, infotainment-related functions, and so forth. The drive-related functions are functions related to "driving" (traveling) of the vehicle, such as control of the engine, electric motors, fuel, battery, transmission, and so forth. The chassis-related functions are functions relating to control of behavior and so forth of the vehicle such as "turning" and "stopping" and so forth, by the brakes, steering, and so forth. The body-related functions are functions relating to control of equipment of the vehicle such as door locks, air conditioning, lights, turn indicators, and so forth. The safety/comfort functions are functions for automatically realizing safe and comfortable driving, such as automatic braking, lane keeping functions, inter-vehicle distance keeping functions, collision-prevention functions, airbags, and so forth. The ITS-related functions are functions handling freeway traffic systems such as Electronic Toll Collection System (ETC) and so forth. The telematics-related functions are functions handling services using mobile telecommunication. The infotainment-related functions are entertainment functions relating to automotive navigation, audio, and so forth.

The CAN message ID 1202 indicates the ID of the CAN message (CAN message ID) set to be transmitted by the ECU belonging to the corresponding function type 1201. The level 1203 indicates the security level of the level determined beforehand in light of safety and so forth of the vehicle in a case where the ECU is unauthorizedly controlled, in accordance with the nature of the function of the ECU belonging to the corresponding function type 1201. For example, 1 through 4 represent a value of one out of four stages. Here, the higher the security level is, the more safety is affected. In the example in FIG. 7, the drive-related functions and chassis-related functions relate to basic functions such as "driving", "turning", and "stopping", so the security level is set to 4 which is high, since in a case where an ECU bearing these functions is unauthorizedly controlled, it is conceivable that accidents with other vehicles will readily occur. On the other hand, in a case where an ECU bearing infotainment-related functions is unauthorizedly controlled, it is unlikely that this will directly influence whether or not an accident will occur, so the security level is set to 1, which is low.

1.8 Inter-Vehicle Communication Message Format

The inter-vehicle communication message 300 is used as an anomaly detection notification to make notification to the effect among vehicles that an anomaly has been detected. FIG. 8 is a diagram illustrating an example of the configuration of the inter-vehicle communication message 300. The format of the inter-vehicle communication message 300 is configured including a common application header portion, a common application data portion, a free application header portion, and a free application data portion. FIG. 8 illustrates an example, were, in a case where the anomaly detection ECU 110 detects an anomaly in the vehicle, the free application data portion is used to convey to the effect that an anomaly has been detected, and in a case of performing communication for other usages, the free application data portion is used according to different formats determined for each usage.

The common application header portion is configured of a common application header information 301, the common application header information 301 including size information of the common application data portion.

The common application data portion includes a clock time information 302, a position information 303, a vehicle state information 304, and vehicle attributes information 305.

The clock time information 302 indicates clock time information of year, month, day, hour, minute, and second.

The position information 303 is information indicating the position of the vehicle acquired by a GPS receiver or the like, such as latitude, longitude, and altitude.

The vehicle state information 304 is information of vehicular speed, the bearing angle of the vehicle, forwards-backwards acceleration, gearshift position, steering angle, and so forth.

The vehicle attributes information 305 includes information of the vehicle class, such as large vehicles, passenger cars, motorcycles, and so forth, usage type such as private vehicle, emergency vehicle, road maintenance vehicle, and so forth, vehicle size such as breadth and length and height, and so forth.

The free application header portion is configured of a free application header information 306, the free application header information 306 including information such as size, offset, and so forth, of the free application data portion.

The free application data portion indicates information relating to anomaly detection, and is configured including a level information 307, an unauthorized vehicle position information 308, and a signature data 309.

The level information 307 indicates a level (security level) corresponding to the unauthorized CAN message (content of anomaly detection) that the anomaly detection ECU 110 has detected, as illustrated in FIG. 7.

The unauthorized vehicle position information 308 is position information indicating the location at the time of anomaly detection, which has been measured regarding the vehicle where the anomaly detection ECU 110 has detected an anomaly (i.e., the vehicle in which is installed the anomaly detection ECU that has detected the anomaly).

The signature data 309 is an electronic signature for the inter-vehicle communication message 300.

1.9 Anomaly Detection Sequence

FIG. 9 is a sequence diagram illustrating an operation example of each part of the vehicle 10 up until transmitting an inter-vehicle communication message 300 to the to the vehicle 20 (vehicle B) in a case where an anomaly has been detected at the vehicle 10 (vehicle A).

In a case of having detected an unauthorized CAN message, the anomaly detection ECU 110 of the vehicle 10 (vehicle A) notifies the level interpreting unit 120 of anomaly information including the frame ID (CAN message ID) of the unauthorized CAN message, that is the content of the anomaly detection (step S201).

The level interpreting unit 120 of the vehicle 10 that has received notification of the anomaly information identifies the level (security level) according to the CAN message ID that the anomaly information indicates, and sets level information indicating that level, based on the level information 1200 that it stores (step S202). That is to say, the level information indicates one level that has been selected, from the multiple levels predetermined by dividing CAN message IDs, based on the CAN message ID of the unauthorized frame (unauthorized CAN message).

The level interpreting unit 120 notifies the set level information to the inter-vehicle communication message authentication unit 130 of the vehicle 10 (step S203).

The inter-vehicle communication message authentication unit 130 of the vehicle 10 that has received the notification of level information acquires current position information of the vehicle 10 from the position information acquisition unit 190, and forms an inter-vehicle communication message 300 by setting this position information and the level information regarding which notification has been received.

Next, the inter-vehicle communication message authentication unit 130 of the vehicle 10 affixes an electronic signature to the inter-vehicle communication message 300 using the vehicle A secret key 1301 (step S205). The inter-vehicle communication message authentication unit 130 notifies the inter-vehicle communication message 300 to which the electric signature has been affixed to the inter-vehicle communication message transmission/reception unit 140 of the vehicle 10 (step S206).

The inter-vehicle communication message transmission/reception unit 140 of the vehicle 10, which has received the notification of the inter-vehicle communication message 300, transmits the inter-vehicle communication message 300 and the vehicle A public key certificate 1302 to the vehicle 20 (vehicle B) by inter-vehicle communication. Note that transmission of the inter-vehicle communication message 300 from the vehicle 10 (vehicle A) to the vehicle 20 (vehicle B) does not particularly identify the target vehicle. Accordingly, the inter-vehicle communication message 300 is broadcast to unspecified vehicles by a communication method that can be propagated backwards from the vehicle A.

1.10 Handling Information (Safety State List)

Figure 10:
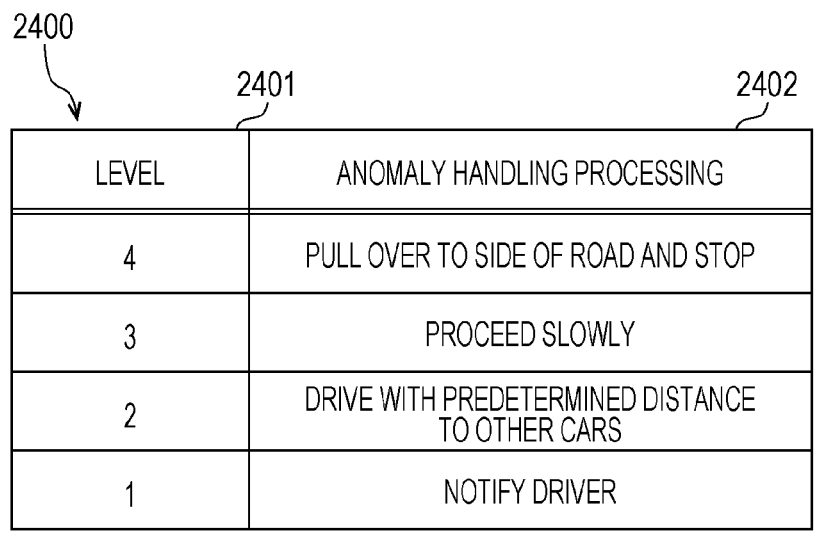
FIG. 10 is a diagram illustrating an example of handling information according to the first embodiment.

FIG. 10 is a diagram illustrating handling information (safety state list) that the level interpreting unit 120 references. The handling information (safety state list) is information correlating which anomaly handling processing out of a plurality of anomaly handling processing determined beforehand should be executed to transition to which safety state, at the time of a vehicle which has received the inter-vehicle communication message 300 performing anomaly handling processing to effect control to transition to a safety state in accordance with the level (security level) indicated by the level information within the inter-vehicle communication message 300.

Handling information (safety state list) 2400 is configured with a level 2401 and an anomaly handling processing 2402 correlated for each of multiple level 2401 values (security levels). The level 2401 indicates the same security level as the level 1203 in the level information illustrated in FIG. 7.

The anomaly handling processing 2402 is information for identifying the anomaly handling processing for performing control to transition to a safe state, set corresponding to each security level. In the example in the handling information in FIG. 10, in a case where the security level is "1", anomaly handling processing for control of notifying the driver of the vehicle is correlated. In a case where the security level is "2", anomaly handling processing for control of driving while maintaining inter-vehicle distance between the vehicle and the vehicle ahead within a predetermined range is correlated. In a case where the security level is "3", anomaly handling processing for control proceeding slowly is correlated. In a case where the security level is "4", anomaly handling processing for control of stopping the vehicle is correlated. Control of notifying the driver of the vehicle is, for example, control of displaying a message on a display screen used for the automotive navigation or the like, to notify and alert the driver, or control to notify the driver by causing a light-emitting diode (LED) on the instrument panel within the vehicle to light, or the like. It is preferable that consideration be given to suppression of adverse effects on the traffic system in the correlation of the handling information 2400 so that traffic congestion is not caused in a case of having detected an anomaly regarding which it is conceivable that the likelihood of directly influencing occurrence of accidents is small.

Figure 11:
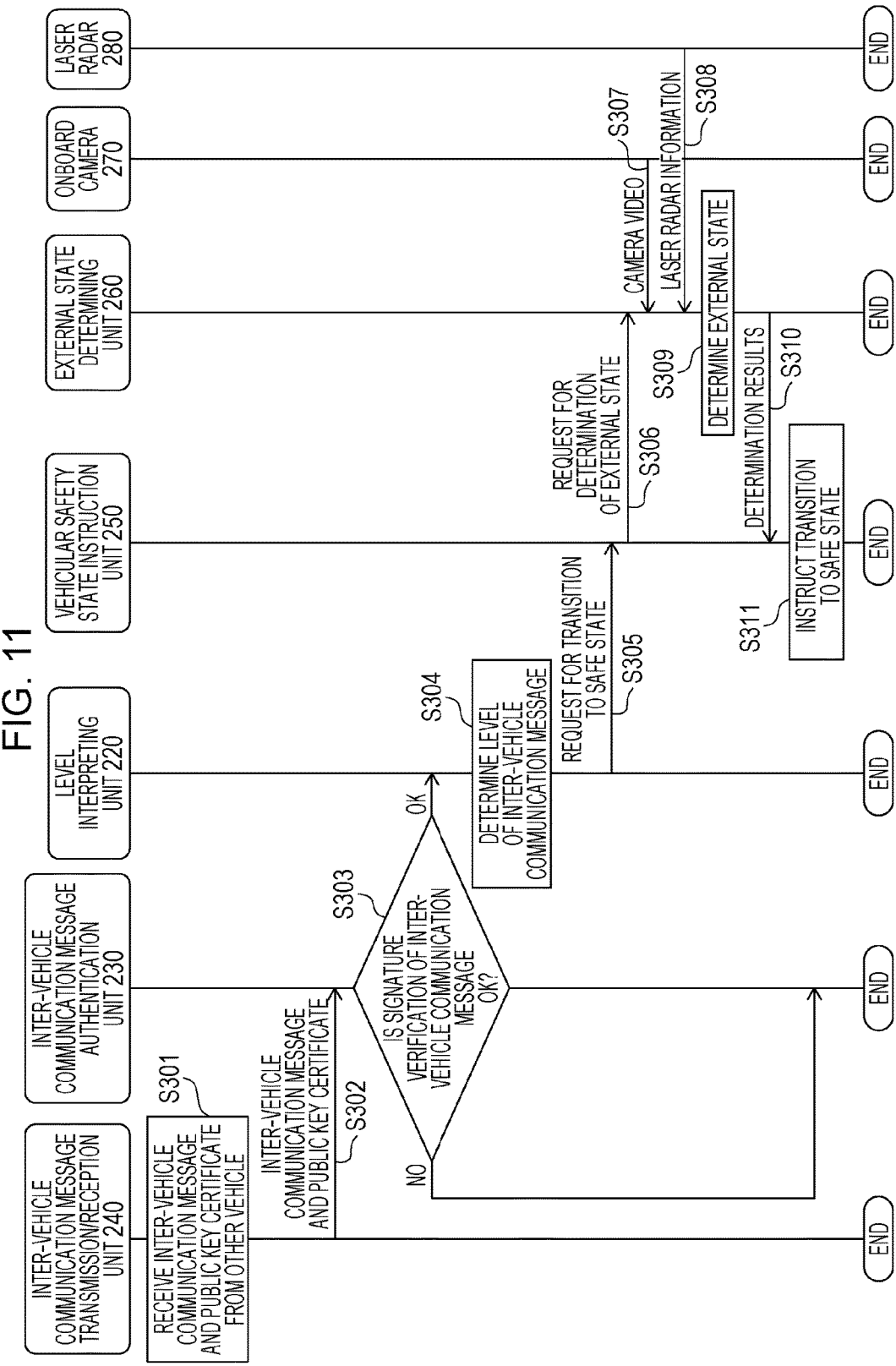
FIG. 11 is a sequence diagram illustrating operations of each part of the vehicle at the time of receiving an inter-vehicle communication message according to the first embodiment.

1.11 Transition Sequent to Safe State Corresponding to Anomaly Detection Notification FIG. 11 is a sequence diagram illustrating operations of the parts up to transitioning to a safe state in the vehicle 20 (vehicle B) that has received an inter-vehicle communication message from the vehicle 10 (vehicle A). The inter-vehicle communication message transmission/reception unit 240 of the vehicle 20 (vehicle B) receives the inter-vehicle communication message 300 as an anomaly detection notification and the vehicle A public key certificate 1302 from the vehicle 10 (vehicle A) (step S301).

Next, the inter-vehicle communication message transmission/reception unit 240 of the vehicle 20 notifies the inter-vehicle communication message authentication unit 230 of the inter-vehicle communication message 300 and the vehicle A public key certificate 1302 (step S302).

The inter-vehicle communication message authentication unit 230 of the vehicle 20 uses the public key of the CA certificate 1300 to verify the signature of the received vehicle A public key certificate 1302, and then uses the vehicle A public key certificate 1302 to verify the signature of the received inter-vehicle communication message 300 (step S303). If the signature verification fails, the processing ends. If the signature verification is successful, the level interpreting unit 220 is notified of the level information in the inter-vehicle communication message 300.

The level interpreting unit 220 of the vehicle 20 references the handling information (safety state list) illustrated in FIG. 10, identifies (determines) which anomaly handling processing to executed to transition to which safety state, in accordance with the level (security level) that the level information in the inter-vehicle communication message 300 indicates (step S304), and notifies the vehicular safety state instruction unit 250 of an execution instruction of that anomaly handling processing (request to transition to the safe state) (step S305). The anomaly handling processing is performed in these steps S305 through S311.

The vehicular safety state instruction unit 250 of the vehicle 20 executes the anomaly handling processing to transition to a safe state, and requests the external state determining unit 260 for determination regarding the situation outside of the vehicle as necessary (step S306).

The external state determining unit 260 acquires information from various types of sensors such as the onboard camera 270 and laser radar 280 and the like (steps S307, S308), determines the situation around the vehicle 20 by analyzing the acquired information (step S309), and notifies the vehicular safety state instruction unit 250 of information so that the vehicle can be appropriately transitioned to the safe state (step S310).

The vehicular safety state instruction unit 250 of the vehicle 20 uses information from the external state determining unit 260 as necessary to maintain execution of the anomaly handling processing, thereby controlling the vehicle 20 so as to transition to a safe state (step S311). Accordingly, appropriate transition of the vehicle 20 (vehicle B) to a safe state is realized in accordance with the security level indicated by the inter-vehicle communication message 300 serving as the anomaly detection notification that the vehicle 10 (vehicle A) has transmitted.

1.12 Advantages of First Embodiment

As described above, the anomaly handling method that the inter-vehicle communication system uses according to the first embodiment is an anomaly handling method that handles an unauthorized situation by performing inter-vehicle communication between a vehicle A (first vehicle) and a vehicle B (second vehicle), for example. Now, in a case where an unauthorized frame is detected on the onboard network installed in the vehicle A (first vehicle), a device (e.g., an ECU or the like) installed in the vehicle A transmits an anomaly detection notification, one or multiple ECUs installed in the vehicle B (second vehicle) receives the anomaly detection notification, selects anomaly handling processing from multiple predetermined anomaly handling processings in accordance with the content of the anomaly detection notification that has been received, and executes the selected anomaly handling processing. In a state where an unauthorized frame has been detected there is a high possibility that the vehicle will be unauthorizedly controlled, so the effect of the unauthorized control can be suppressed by notifying other vehicles. More specifically, At the time of detection of the unauthorized frame, the device installed in the vehicle A includes level information, indicating one level selected from multiple predetermined levels where frame IDs have been divided, based on the frame ID of the unauthorized frame, in the anomaly detection notification and transmits the anomaly detection notification. The one or multiple ECUs installed in the vehicle B select the anomaly handling processing in accordance with the level that the level information included in the received anomaly detection notification indicates, and transitions to a safe state by execution of the selected anomaly handling processing.

According to the anomaly handling method used by such an inter-vehicle communication system, even in a situation where a vehicle (vehicle A) that is traveling ahead is about to be unauthorizedly controlled by an unauthorized CAN message on the internal onboard network of the vehicle A, the vehicle A notifies vehicles following behind itself. A vehicle (vehicle B) behind, that has received the anomaly detection notification, can transition to a safe state in accordance with the level (security level) indicated by the anomaly detection notification, and appropriate handling can be performed in accordance with the situation. Accordingly, an accident or the like where the vehicle B would be involved can be prevented from occurring. Also, the level indicated as the anomaly detection notification can be set beforehand in light of the degree of effect of the unauthorized CAN message detected in the onboard network, for example, and the safe state to which transmission is to be made corresponding to that level can be set beforehand taking into consideration suppression of adverse effects on the traffic system, for example. Thus, A vehicle that has received an anomaly detection notification can transmission to a safe state that is appropriate for the situation.

Second Embodiment

A partial modification of the above-described inter-vehicle communication system will be described below as a second embodiment of the present disclosure. An example has been illustrated in the anomaly handling method of the inter-vehicle communication system described in the first embodiment, where an anomaly detection notification relating to an anomaly having been detected at the vehicle 10 (vehicle A) is transmitted to one vehicle 20 (vehicle B) behind the vehicle 10. In comparison with this, the inter-vehicle communication system according to the present embodiment can transfer the anomaly detection notification, as an anomaly handling method. That is to say, the inter-vehicle communication system according to the present embodiment performs anomaly detection notification transmission so that multiple vehicles following behind the vehicle 10 (vehicle A) can receive, by the vehicle 10 (vehicle A) transmitting an anomaly detection notification relating to a detected anomaly and vehicles which have received this anomaly detection notification transferring this anomaly detection notification under certain conditions. The configuration of the inter-vehicle communication system according to the second embodiment (e.g., components of the vehicles, etc.) are the same as those illustrated in the first embodiment, so description thereof will be omitted, and parts which differ from the first embodiment will be described here.

2.1 Transfer of Inter-Vehicle Communication Message

Figure 12:
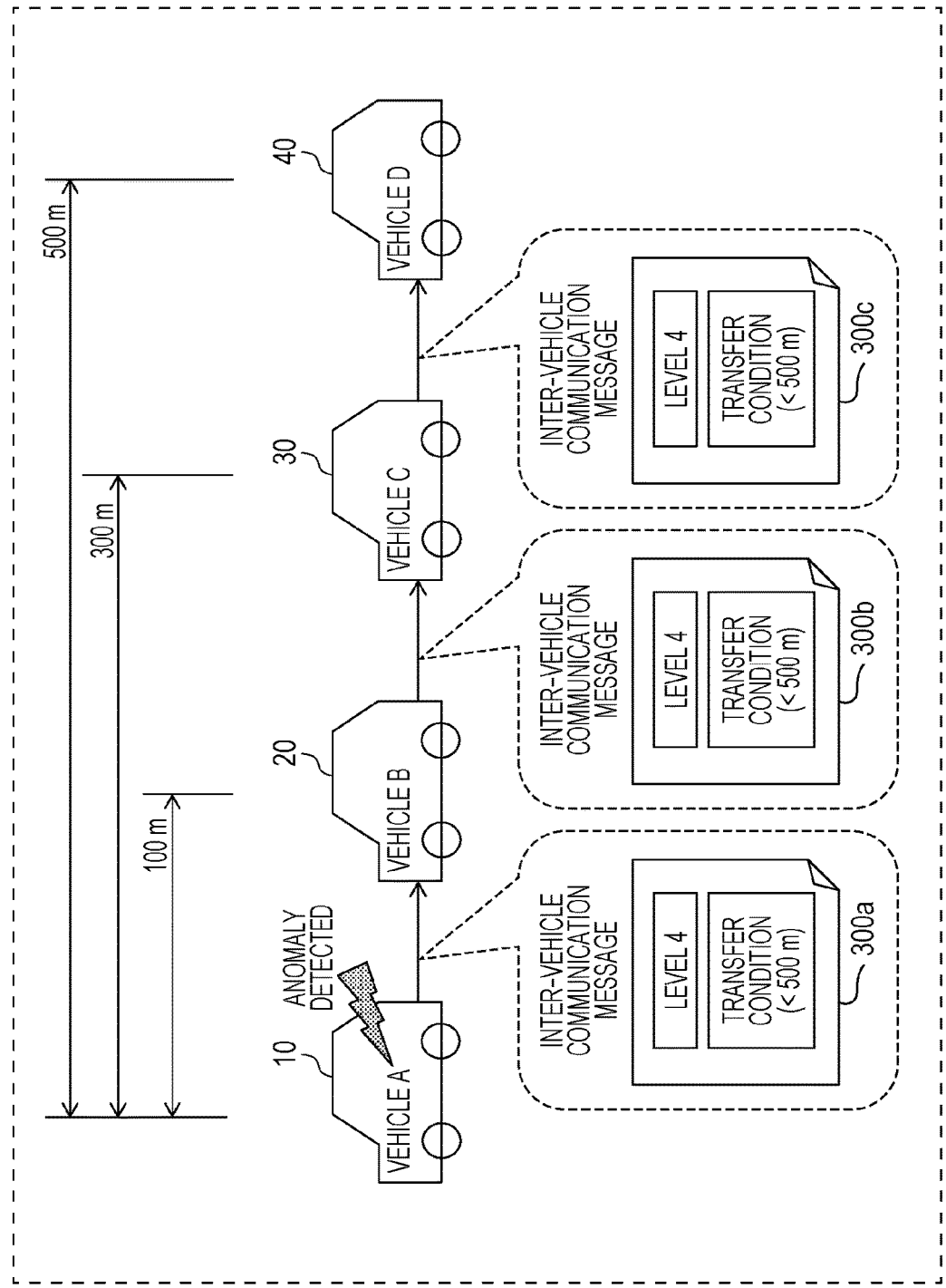
FIG. 12 is a diagram illustrating an example of multiple vehicles consecutively notifying inter-vehicle communication messages to vehicles following behind, according to a second embodiment.

FIG. 12 is a diagram illustrating an example of multiple vehicles consecutively notifying inter-vehicle communication messages as anomaly detection notifications to vehicles following behind. The vehicles which have received the inter-vehicle communication message serving as an anomaly detection notification determine whether or not predetermined conditions (transfer conditions) are satisfied, and in a case of having determined that these are satisfied, transmits (transfers) the anomaly detection notification externally from the vehicles. Transfer conditions are conditions relating to whether or not to transfer, and in the example in FIG. 12, this is a condition that the distance from the vehicle which has detected the anomaly is less than 500 m.

In this example, the vehicle 10 (vehicle A) detects an anomaly, and transmits an inter-vehicle communication message 300a from the vehicle A to other vehicles as an anomaly detection notification. The vehicle 20 (vehicle B) following behind the vehicle A receives the inter-vehicle communication message 300a from the vehicle A, and in order to transfer information relating to the anomaly detection included in the inter-vehicle communication message 300a (level information indicating level 4 in the example in FIG. 12 and so forth) to other vehicles, transmits an inter-vehicle communication message 300b including information relating to that anomaly detection. A vehicle 30 (vehicle C) following behind the vehicle B receives the inter-vehicle communication message 300b from the vehicle B, and in order to transfer information relating to the anomaly detection included in the inter-vehicle communication message 300b to other vehicles, transmits an inter-vehicle communication message 300c including information relating to that anomaly detection. A vehicle 40 (vehicle D) following behind the vehicle C receives the inter-vehicle communication message 300c from the vehicle C. The vehicle D is 500 m away from the vehicle A, and does not satisfy the transfer condition of the distance to the vehicle that has detected the anomaly being less than 500 m, so transfer is not performed. Note that the vehicle C and vehicle D basically have the same configuration as the vehicle B.

2.2 Inter-Vehicle Communication Message Format

Figure 13:
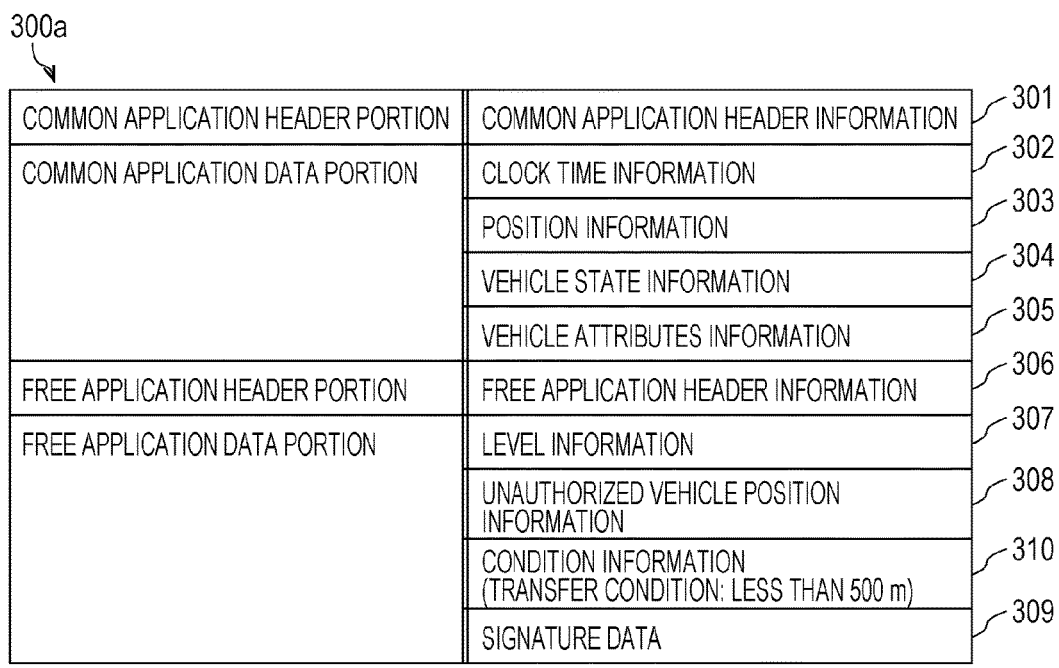
FIG. 13 is a diagram illustrating an example of the configuration of an inter-vehicle communication message according to the second embodiment.

FIG. 13 is a diagram illustrating an example of the configuration of the inter-vehicle communication message according to the present embodiment. The inter-vehicle communication message 300a according to the present embodiment (as well as the inter-vehicle communication messages 300b and 300c) has a configuration where condition information 310 indicating transfer conditions has been added to the configuration of the inter-vehicle communication message 300 illustrated in the first embodiment (see FIG. 8). Accordingly, the range over which retransmission (transfer) will be performed can be restricted.

The transfer condition that the condition information 310 indicates is a condition regarding distance from the vehicle where the anomaly detection has been made, and for example is a condition where the distance between a position measured regarding one vehicle and a position that the position information (unauthorized vehicle position information 308) included in the received anomaly detection notification indicates are within a certain range. The condition information 310 indicates that the distance as to the vehicle where the anomaly detection has been made is less than 500 m or the like, in a specific example. In this case, in a case where the vehicle that has received the inter-vehicle communication message 300a or the like is less than 500 m away from the vehicle where the anomaly detection has been made, transfer is performed. Note that the position of the vehicle where the anomaly detection has been made is indicated by the unauthorized vehicle position information 308 within the inter-vehicle communication message 300a. Accordingly, the vehicle which has received the inter-vehicle communication message 300a (e.g., the vehicle 20) calculates the distance between the position of the vehicle A where the anomaly detection has been made as indicated by the unauthorized vehicle position information 308, and the position of the own vehicle detected by the position information acquisition unit 290 (see FIG. 2) for example, and determines whether or not to retransmit (transfer) the inter-vehicle communication message 300a based on the transfer condition indicated by the condition information 310. Note that transfer of the inter-vehicle communication message 300a includes transferring with part of the contents of the inter-vehicle communication message 300a having been changed (i.e., transfer of the inter-vehicle communication message 300b). Specific values of the signature data 309, common application data portion, and so forth, in the inter-vehicle communication messages 300a and 300b may be different for each vehicle. However, the specific values of the level information 307, the unauthorized vehicle position information 308, and the condition information 310, in the inter-vehicle communication messages 300a and 300b, remain the same.

2.3 Transfer Sequence of Anomaly Detection Notification

Figure 14:
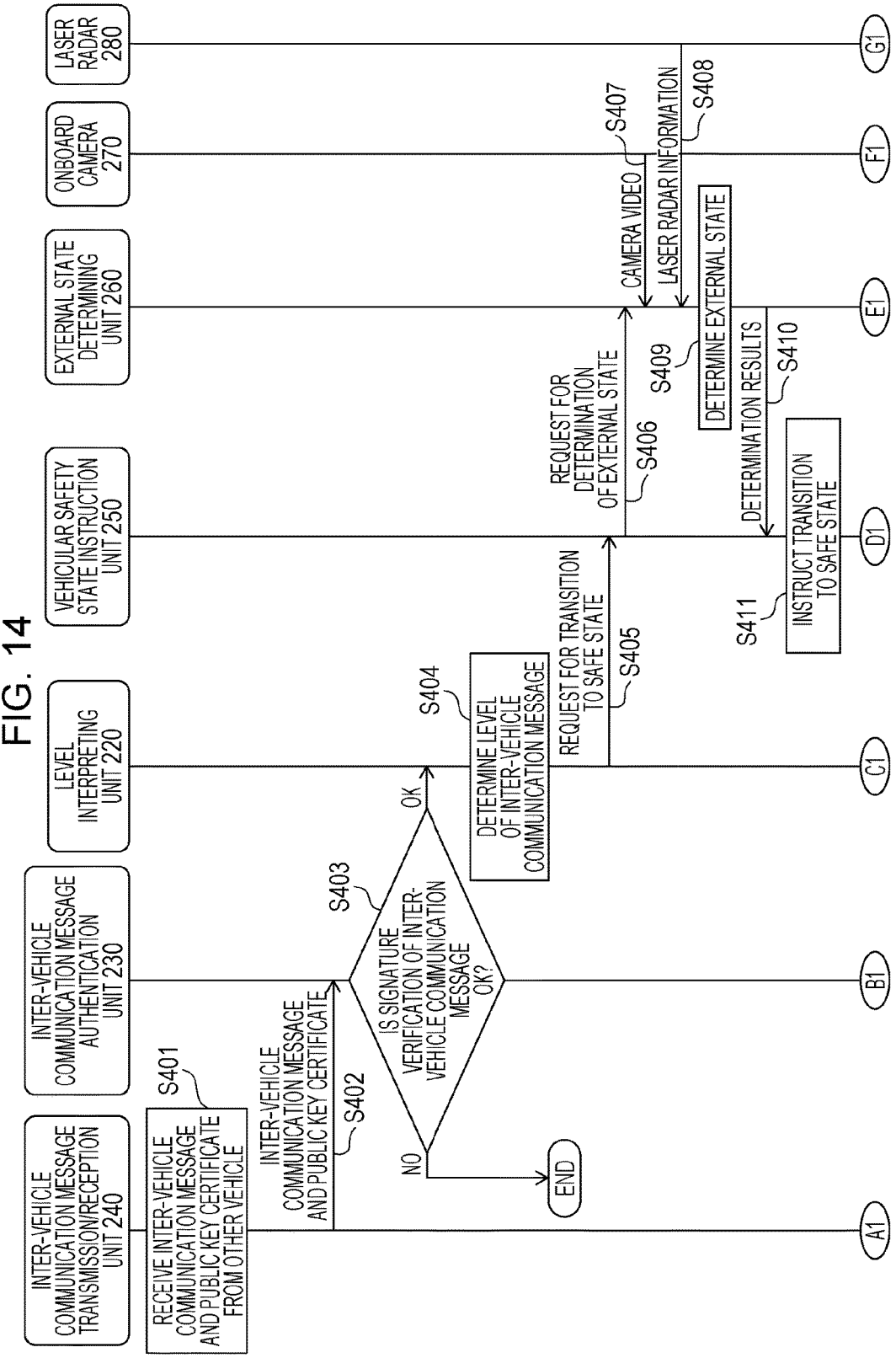
FIG. 14 is a sequence diagram illustrating operations of each part at the time of the vehicle receiving and transferring an inter-vehicle communication message, according to the second embodiment (continued in FIG. 15)
Figure 15:
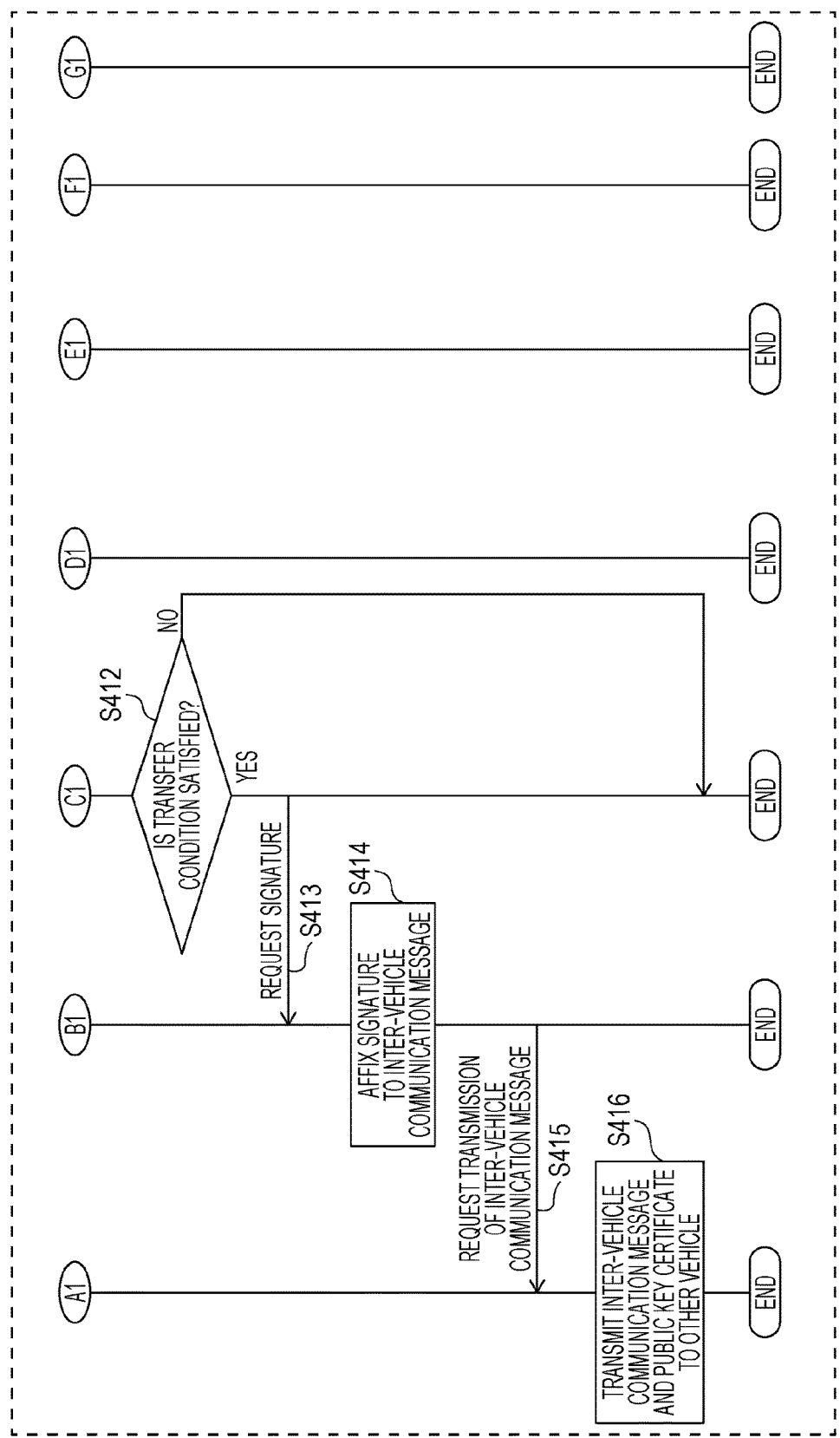
FIG. 15 is a sequence diagram illustrating operations of each part at the time of the vehicle receiving and transferring an inter-vehicle communication message, according to the second embodiment (continued from FIG. 14)

FIGS. 14 and 15 are sequence diagrams illustrating operations of the parts in a case of a vehicle receiving and transferring an inter-vehicle communication message. An example will be described here regarding a case where the vehicle 20 (vehicle B) receives an inter-vehicle communication message as an anomaly detection notification from the vehicle 10 (vehicle A). Step S401 through step S411 are the same as step S301 through step S311 (see FIG. 11) described in the first embodiment, so description will be omitted.

The level interpreting unit 220 of the vehicle B in step S412 reference the transfer conditions that the condition information 310 in the inter-vehicle communication message 300a, including the level information 307 referenced in step S404, indicates, and determines whether or not the transfer conditions are satisfied. That is to say, the level interpreting unit 220 acquires the position of its own vehicle from the position information acquisition unit 290, references the unauthorized vehicle position information 308 in the inter-vehicle communication message 300a, and calculates the distance between the vehicle A where the anomaly has been detected to its own vehicle. In a case where the calculated distance satisfies the transfer condition, the level interpreting unit 220 hands over to the inter-vehicle communication message authentication unit 230 so that information the same as the level information 307, unauthorized vehicle position information 308, and condition information 310 included in the inter-vehicle communication message 300a can be set to the level information 307, unauthorized vehicle position information 308, and condition information 310 in the inter-vehicle communication message 300b, and requests a signature (step S413). In a case where the transfer condition is not satisfied, the vehicle B does not perform the transfer and ends the processing.

The inter-vehicle communication message authentication unit 230 that has been requested for a signature in step S413 forms the inter-vehicle communication message 300b by setting the information handed to the level interpreting unit 220, generates an electronic signature using the vehicle B secret key 2301, and includes this in the inter-vehicle communication message 300b as signature data 309 (step S414).

The inter-vehicle communication message authentication unit 230 then communicates the inter-vehicle communication message 300b to which the electronic signature has been affixed to the inter-vehicle communication message transmission/reception unit 240 of vehicle B, and requests transmission (step S415).

Next, the inter-vehicle communication message transmission/reception unit 240 transmits the inter-vehicle communication message 300b and the vehicle B public key certificate 2302 to the vehicle 30 (vehicle C) following behind by inter-vehicle communication. In the same way as with the anomaly detection notification from vehicle A to vehicle B by inter-vehicle communication message 300a, the transmission of the inter-vehicle communication message 300b to serve as transfer of the anomaly detection notification from the vehicle B to vehicle C does not identify the vehicle C as the recipient of the transmission in particular. Accordingly, the inter-vehicle communication message 300b is broadcast to unspecified vehicles by a communication method that can be propagated backwards from the vehicle B.

In the same way as with the above-described vehicle B, transfer of the anomaly detection notification is performed in a case where the transfer conditions indicated by the received inter-vehicle communication message are satisfied at other vehicles (e.g., vehicle C following behind the vehicle B), and transfer is not performed in a case where the transfer conditions are not satisfied.

2.4 Advantages of Second Embodiment

According to the anomaly handling method used by the inter-vehicle communication system of the second embodiment, in addition to the advantages yielded by the inter-vehicle communication system of the first embodiments, multiple vehicles following being the vehicle where the anomaly has been detected can transition to a safe state. Accordingly, a large accident where three or more vehicles are involved can be prevented, for example.

Third Embodiment

A partial modification of the inter-vehicle communication system described in the second embodiment will be described below as a third embodiment of the present disclosure. In the anomaly handling method used in the inter-vehicle communication system according to the present embodiment, the content of level information, which is part of information relating to anomaly detection in an anomaly detection notification (inter-vehicle communication message) is changed and transferred. Points of the inter-vehicle communication system according to the third embodiment that are the same as in the first embodiment and second embodiment described above will be omitted from description, and points that differ will be described here.

3.1 Inter-Vehicle Communication Message Format

FIG. 16 is a diagram illustrating an example of the configuration of the inter-vehicle communication message according to the third embodiment. An inter-vehicle communication message 300A according to the present embodiment has a configuration where a reset level information 311, and a level changing conditions 312 indicating predetermined level changing rules that are rules for updating the reset level information, have been added to the configuration of the inter-vehicle communication message 300a (see FIG. 13) described in the second embodiment. Accordingly, the security level can be changed when retransmitting (transferring) an inter-vehicle communication message, and transmission thus performed.

The reset level information 311 has set therein a value (level) to which the security level, indicated by the level information 307 set at the vehicle where the anomaly detection has been made, has been changed, in accordance with the level changing conditions 312 at the time of a vehicle that has received an inter-vehicle communication message retransmits (transfers) the inter-vehicle communication message to another vehicle. Note that the vehicle A where the anomaly detection has been made sets the same value as the level information 307 to the reset level information 311 of the inter-vehicle communication message 300A.

3.2 Level Changing Conditions 312

FIG. 17 is a diagram illustrating an example of the level changing conditions 312. In the example in FIG. 17, the level changing conditions 312 indicating predetermined level changing rules show the contents of change (level change contents) in accordance with the conditions for changing the level (distance to unauthorized vehicle), in particular.

The vehicle which has received the inter-vehicle communication message 300A calculates the distance between the unauthorized vehicle and its own vehicle from the position of its own vehicle and the unauthorized vehicle (i.e., the vehicle A regarding which the anomaly has been detected), and compares the calculated distance with the conditions that the level changing conditions 312 indicates to change the level, whereby the value to which the reset level information 311 should be set can be identified in accordance with that distance.

In the example in FIG. 17, if the distance to the unauthorized vehicle is less than 100 m, the reset level information 311 set at the unauthorized vehicle is maintained without being changed at the time of transfer. For example, "level 4" is set in the level information 307 in the inter-vehicle communication message that a vehicle at a position where the distance to the unauthorized vehicle is less than 100 m has transmitted, and the same value "level 4" is also set in the reset level information 311 as well.

Also, in the example in FIG. 17, the level changing contents in a case where the distance as to the unauthorized vehicle is 100 m or more but less than 300 m is shown to lower the reset level information 311 by 1 (decremented by 1) from the level information 307 set at the unauthorized vehicle. For example, in an inter-vehicle communication message transmitted (transferred) from a vehicle at a position 100 m or more but less than 300 m from the unauthorized vehicle, "level 4" is set in the level information 307, and "level 3" that has been decremented by 1 is set in the reset level information 311.

The example in FIG. 17 also shows that the level changing contents in a case where the distance as to the unauthorized vehicle is 300 m or more but less than 500 m lower the reset level information 311 by 2 (decremented by 2) from the level information 307 set at the unauthorized vehicle. For example, in an inter-vehicle communication message transmitted (transferred) from a vehicle at a position 300 m or more but less than 500 m from the unauthorized vehicle, "level 4" is set in the level information 307, and "level 2" that has been decremented by 2 is set in the reset level information 311.

Although description has ben made in the second embodiment that each vehicle that has received an inter-vehicle communication message executes anomaly handling processing to transition to a safe state in accordance with the level (security level) that the level information 307 indicates, in the present embodiment each vehicle that has received the inter-vehicle communication message executes anomaly handling processing to transition to a safe state in accordance with the level set to the reset level information 311 (security level).

3.3 Transmission of Inter-Vehicle Communication Message

Figure 18:
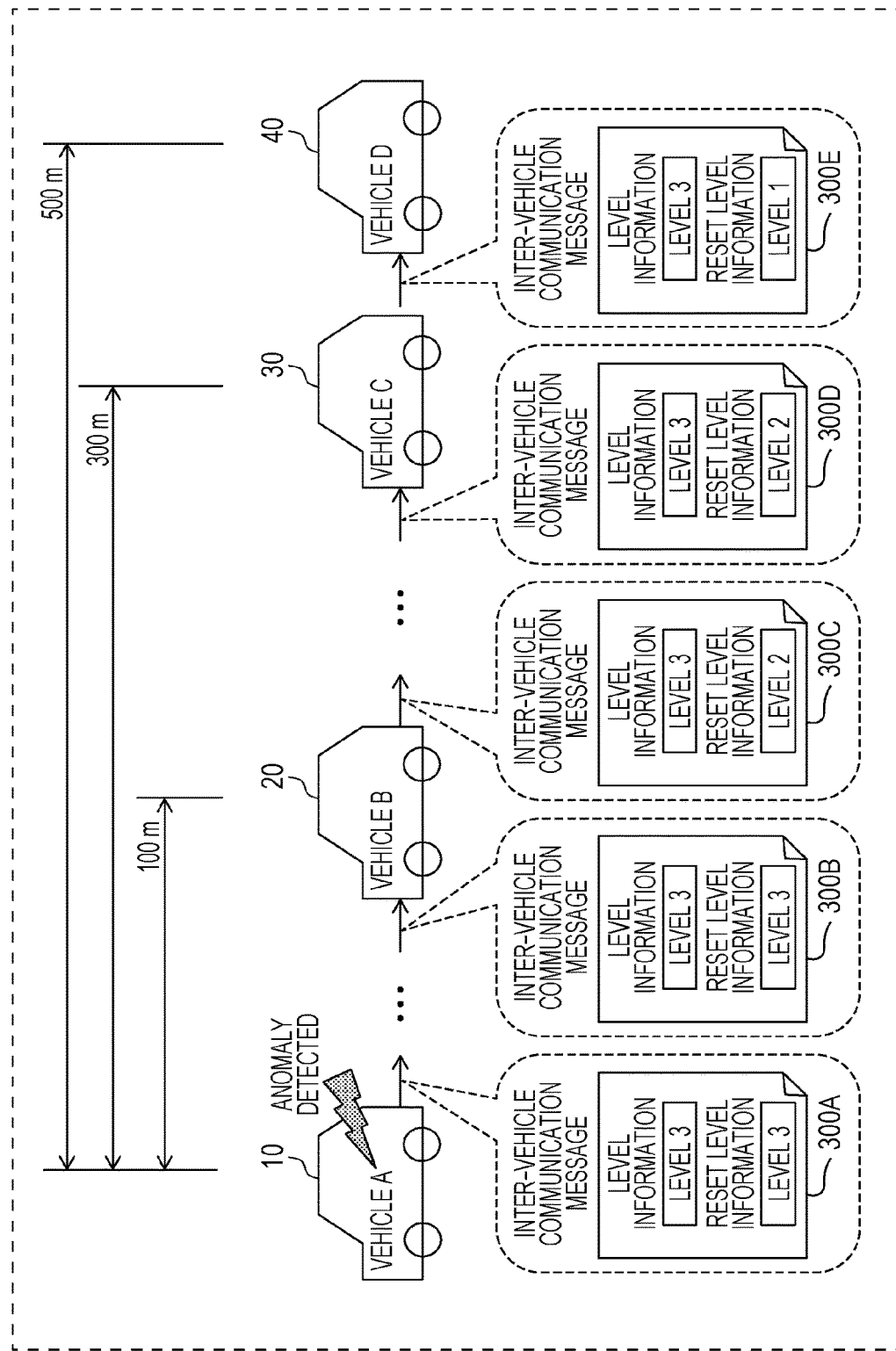
FIG. 18 is a diagram illustrating an example of multiple vehicles consecutively notifying inter-vehicle communication messages to vehicles following behind, according to the third embodiment.

FIG. 18 is a diagram illustrating an example of multiple vehicles consecutively notifying inter-vehicle communication messages as anomaly detection notifications to vehicles following behind. The vehicles that have received an inter-vehicle communication message as an anomaly detection notification changes the reset level information 311 in accordance with the level changing conditions 312 in anomaly detection in a case where the transfer conditions are satisfied, and transmits the anomaly detection notification. The example in FIG. 18 is an example of performing retransmission (transfer) of the anomaly detection notification using the level changing conditions 312 exemplarily illustrated in FIG. 17. There may be cases where the inter-vehicle communication message is transmitted with one or more other vehicles being included between the vehicle 10 (vehicle A) and the vehicle 20 (vehicle B). There also may be cases where the inter-vehicle communication message is transmitted with one or more other vehicles being included between the vehicle B and the vehicle 30 (vehicle C).

In the example in FIG. 18, the vehicle A has detected an anomaly on the onboard network, set the level information 307 and reset level information 311 to "level 3" in accordance with the content of the anomaly, and transmitted the inter-vehicle communication message 300A. Inter-vehicle communication messages 300B through 300E also are configured having the same format as the inter-vehicle communication message 300A (see FIG. 16). For example, the inter-vehicle communication message 300A is transmitted from another vehicle and is received at the vehicle B as inter-vehicle communication message 300B.

The vehicle B that is 100 m away from the position of the vehicle A falls under the condition of distance or 100 m or more but less than 300 m to the unauthorized vehicle, based on the level changing conditions 312 of the inter-vehicle communication message 300B, so the reset level information 311 is decremented from the level information 307 set at the unauthorized vehicle by 1, and the inter-vehicle communication message 300C where the reset level information 311 has been set to "level 2" is transmitted. For example, the inter-vehicle communication message 300C is transmitted from another vehicle and is received at the vehicle C as inter-vehicle communication message 300D.

The vehicle C that is 300 m away from the position of the vehicle A falls under the condition of distance or 300 m or more but less than 500 m to the unauthorized vehicle, based on the level changing conditions 312 of the inter-vehicle communication message 300D, so the reset level information 311 is decremented from the level information 307 set at the unauthorized vehicle by 2, and the inter-vehicle communication message 300E where the reset level information 311 has been set to "level 1" is transmitted.

The vehicle 40 (vehicle D) is at a position 500 m away from the unauthorized vehicle, and does not satisfy the transfer condition of "less than 500 m" that the condition information 310 in the inter-vehicle communication message 300E indicates, so retransmission (transfer) of the inter-vehicle communication message is not performed.

3.4 Transfer Sequence of Anomaly Detection Notification

Figure 19:
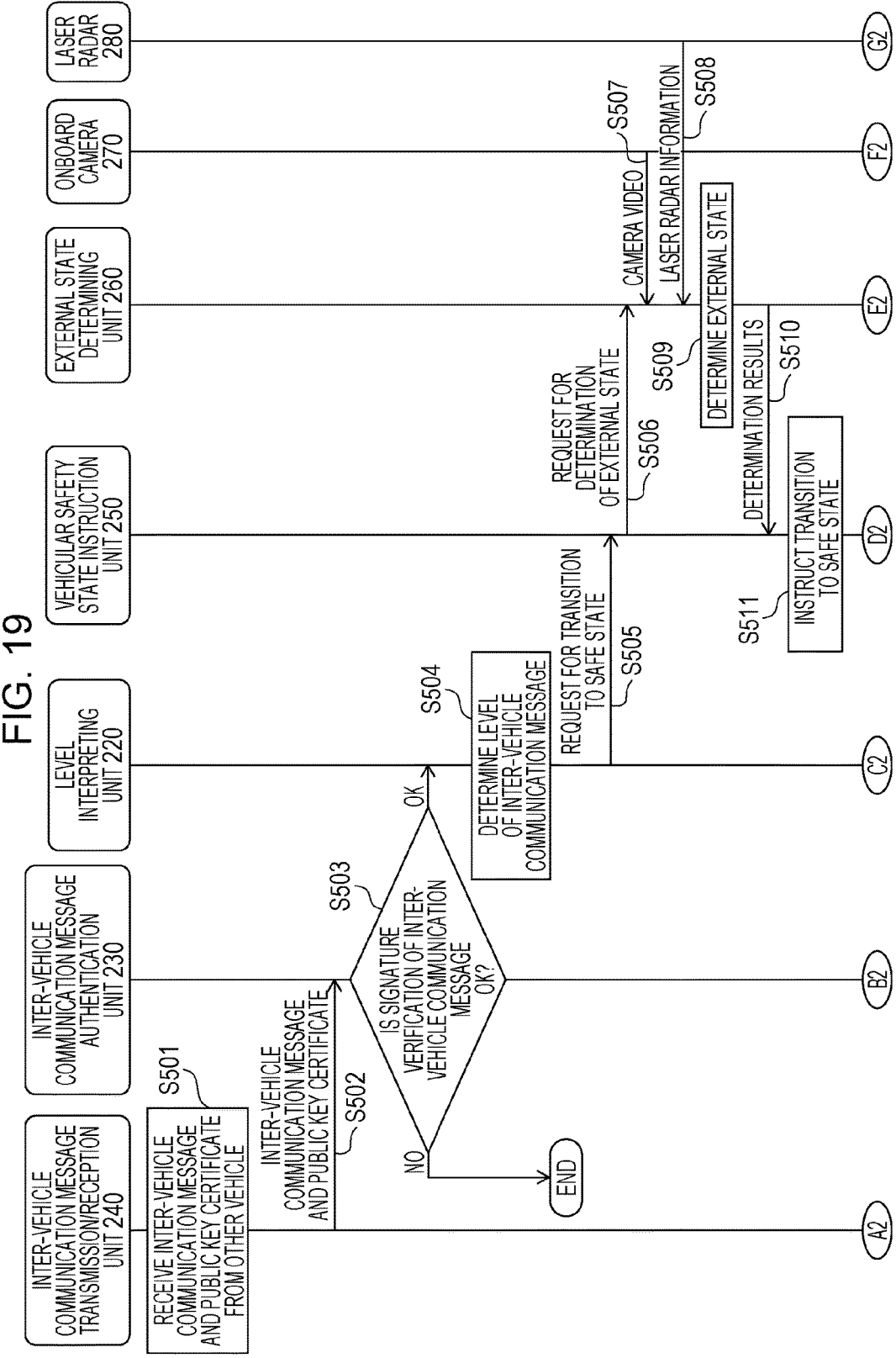
FIG. 19 is a sequence diagram illustrating operations of each part at the time of the vehicle receiving and transferring an inter-vehicle communication message, according to the third embodiment (continued in FIG. 20)
Figure 20:
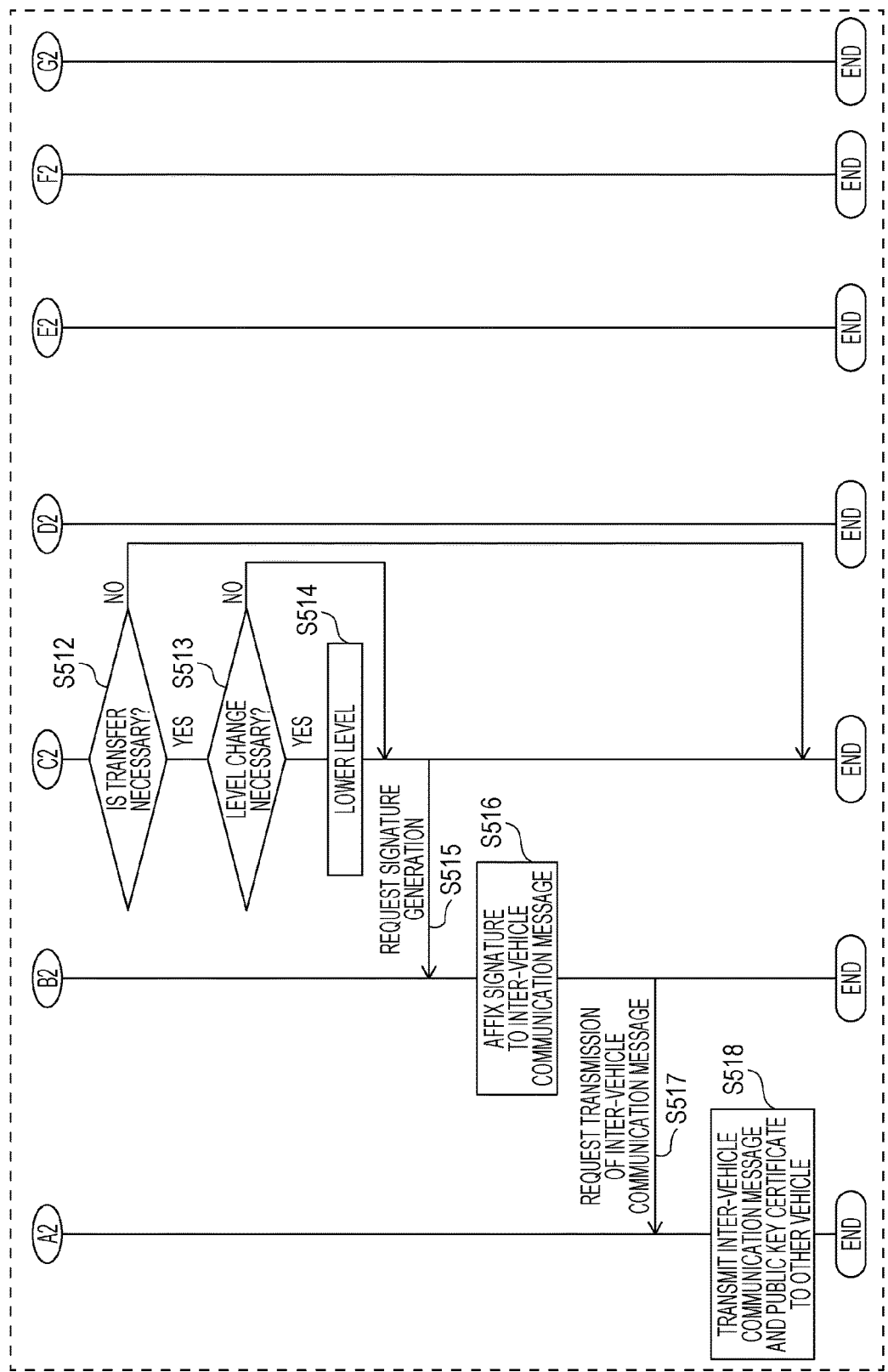
FIG. 20 is a sequence diagram illustrating operations of each part at the time of the vehicle receiving and transferring an inter-vehicle communication message, according to the third embodiment (continued from FIG. 19)

FIGS. 19 and 20 are sequence diagrams illustrating operations of the parts in a case of a vehicle receiving and transferring an inter-vehicle communication message with the level information changed under certain conditions. An example will be described here regarding a case where the vehicle 20 (vehicle B) receives an inter-vehicle communication message B transmitted from the vehicle 10 (vehicle A) and transferred at another vehicle as an anomaly detection notification.

Step S501 through step S511 are the same as step S301 through step S311 (see FIG. 11) described in the first embodiment, so description will be omitted. Note, however, that in step S504, the level interpreting unit 220 of the vehicle B references the handling information (safety state list) shown in FIG. 10, identifies which anomaly handling processing should be executed to transition to which safety state, in accordance with the level (security level) that the reset level information 311 in the inter-vehicle communication message 300B indicates, and notifies the vehicular safety state instruction unit 250 of the execution instruction of that anomaly handling processing (request to transition to safe state) (step S505).

The level interpreting unit 220 of the vehicle B in step S512 reference the transfer conditions that the condition information 310 in the inter-vehicle communication message 300B, including the reset level information 311 referenced in step S504, indicates, and determines whether or not the transfer conditions are satisfied. In a case where the transfer conditions are satisfied, the level interpreting unit 220 references the content of level change corresponding to the conditions that the own vehicle falls under, out of the conditions indicated by the level changing conditions 312 in the inter-vehicle communication message 300B, determines whether or not level change is necessary (step S513), and only in a case where determination is made that level change is necessary is the reset level information 311 lowered in accordance with the contents of the level change (step S514). The level interpreting unit 220 then hands over to the inter-vehicle communication message authentication unit 230 so that information the same as the level information 307, unauthorized vehicle position information 308, condition information 310, and level changing conditions 312 included in the inter-vehicle communication message 300B can be set to the level information 307, unauthorized vehicle position information 308, condition information 310, and level changing conditions 312 in the inter-vehicle communication message 300C, and so that the reset level information 311 of which the level value has been maintained or decremented in accordance with the determination made in step S513 can be set to the reset level information 311 of the inter-vehicle communication message 300C, and requests a signature (step S515). In a case where the transfer condition is not satisfied, the vehicle B does not perform the transfer and ends the processing.

The inter-vehicle communication message authentication unit 230 that has been requested for a signature in step S515 forms the inter-vehicle communication message 300C by setting the information handed to the level interpreting unit 220, generates an electronic signature using the vehicle B secret key 2301, and includes this in the inter-vehicle communication message 300C as signature data 309 (step S516).

The inter-vehicle communication message authentication unit 230 then notifies the inter-vehicle communication message 300C to which the electronic signature has been affixed to the inter-vehicle communication message transmission/reception unit 240 of the vehicle B, and requests transmission (step S517).

Next, the inter-vehicle communication message transmission/reception unit 240 transmits the inter-vehicle communication message 300C and the vehicle B public key certificate 2302 to the other vehicles by inter-vehicle communication so as to be propagated (step S518).

3.5 Advantages of Third Embodiment

According to the anomaly handling method used by the inter-vehicle communication system of the third embodiment, the farther a vehicle following behind the unauthorized vehicle is from the unauthorized vehicle, the lower the level relating to anomaly detection notification (security level indicated by the reset level information). Accordingly, adverse effects on the traffic system (e.g., occurrence of traffic congestion, etc.) can be suppressed by transitioning to a safe state by anomaly handling processing at vehicles that have received the anomaly detection notification.

Fourth Embodiment

Although an example of inter-vehicle communication has been illustrated in the above-descried first through third embodiments, this may be road-vehicle communication between a vehicle and a roadside device installed at the road. A fourth embodiment of the present disclosure illustrates the configuration of a road-vehicle communication system for road-vehicle communication.

4.1 Configuration of Road-Vehicle Communication System

Figure 21:
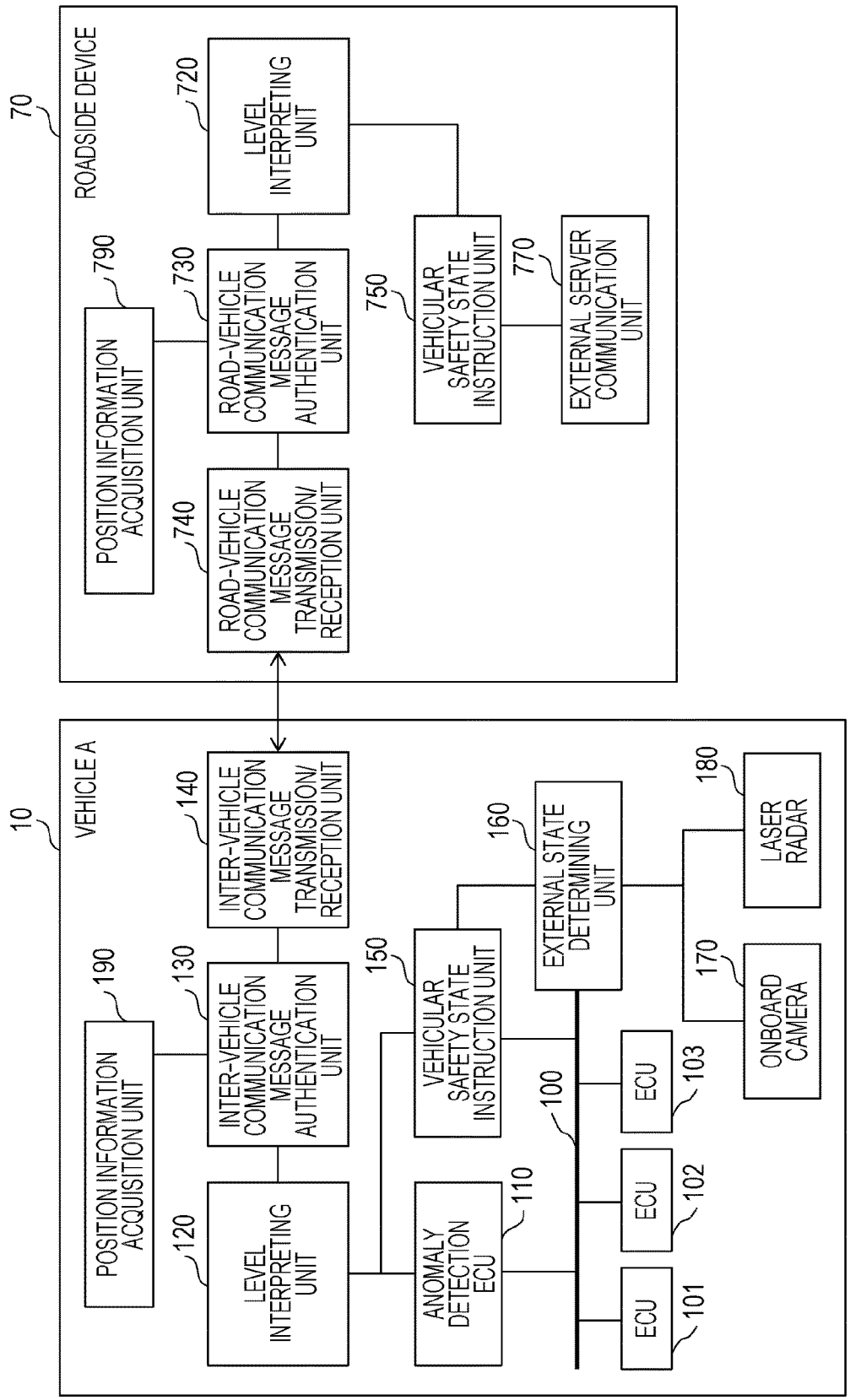
FIG. 21 is a diagram illustrating the overall configuration of a road-vehicle communication system according to a fourth embodiment.

FIG. 21 is a diagram illustrating the overall configuration of a road-vehicle communication system. A configuration for road-vehicle communication is illustrated where the vehicle 10 (vehicle A) detects an anomaly on the onboard network of the own vehicle, an anomaly detection notification indicating information relating to that anomaly detection is transmitted, and a roadside device 70 receives. The configuration of the vehicle A is the same as in any of the above-described first through third embodiments, so description will be omitted. The road-vehicle communication system according to the present embodiment differs from the inter-vehicle communication system illustrated in the first embodiment with regard to the point that the object receiving the inter-vehicle communication message 300 transmitted from the vehicle A is the roadside device 70 installed at the road instead of a moving vehicle.

The roadside device 70 is configured including a position information acquisition unit 790, a road-vehicle communication message transmission/reception unit 740, a road-vehicle communication message authentication unit 730, a level interpreting unit 720, a vehicular safety state instruction unit 750, and an external server communication unit 770.

The level interpreting unit 720 has the same functions as the level interpreting unit 220 of the vehicle 20 (vehicle B) illustrated in any of the first through third embodiments. Note however, that the level interpreting unit 720 notifies the vehicular safety state instruction unit 750 of instructions (execution instructions of anomaly handling processing) to transmission other vehicles to a safe state corresponding to the security level indicated by level information included in the inter-vehicle communication message received from the vehicle A, based on predetermined handling information (safety state list). Anomaly handling processing in the present embodiment is control effected by the vehicular safety state instruction unit 750 to transition vehicles traveling nearby the roadside device 70 to a safe state. The anomaly handling processing includes anomaly handling processing for control to stop vehicles traveling nearby the roadside device 70 from running, anomaly handling processing for control to cause vehicles to proceed slowly, anomaly handling processing for control to cause vehicles to travel with a predetermined distance between itself and a vehicle ahead, anomaly handling processing for control to notify the drivers of the vehicles, and so forth.

The road-vehicle communication message authentication unit 730 stores a secret key and public key certificate necessary for signature generation and signature verification, and performs signature generation or signature verification regarding road-vehicle communication messages. When transmitting (transferring) a road-vehicle communication message, the road-vehicle communication message authentication unit 730 forms the road-vehicle communication message including position information of the roadside device 70 acquired from the position information acquisition unit 790 and so forth, in information acquired from the level interpreting unit 720, and generates a signature using the secret key of the roadside device 70 and includes this in the road-vehicle communication message. The position information acquisition unit 790 may record position information indicating the position where the roadside device 70 has been installed, and notify this position information to the road-vehicle communication message authentication unit 730. The road-vehicle communication message authentication unit 730 also performs signature verification regarding inter-vehicle communication messages received from vehicles, and notifies the level interpreting unit 720 of level information included in the inter-vehicle communication messages.

The vehicular safety state instruction unit 750 executes anomaly handling processing, and through the road-vehicle communication message transmission/reception unit 740 transmits road-vehicle communication messages that give vehicles present nearby the roadside device 70 instructions to transition to a safe state. The format of the road-vehicle communication message at this time is the same as with the inter-vehicle communication message described in the first embodiment through the third embodiment. Note that the roadside device 70 may have an electronic message sign, and the vehicular safety state instruction unit 750 may display instruction information and so forth on the electronic message sign to guide the vehicles nearby to a safe state.

The external server communication unit 770 transmits an inter-vehicle communication message received from the vehicle A to an external server (omitted from illustration). The external server stores inter-vehicle communication messages received from the roadside device 70, and analyze the data to decide contents of instruction, and instruct the roadside device 70 to transition vehicles to a safe state. The roadside device 70 that has received instructions from the external server may use road-vehicle communication to instruct vehicles situated nearby the roadside device 70 to transition to a safe state.

4.2 Advantages of Fourth Embodiment

By using the road-vehicle communication system illustrated in the fourth embodiment with the inter-vehicle communication system according to any one of the first through third embodiments, instructions can be notified to transition vehicles nearby the roadside device to a sate state by road-vehicle communication or the like, thereby enabling a safer traffic system to be realized.

Fifth Embodiment

The following is a partial modification of the inter-vehicle communication system illustrated in the second embodiment. In the anomaly handling method used by the inter-vehicle communication system according to a fifth embodiment, the contents of the predetermined condition (transfer condition) used at the time of determining whether or not to transfer an anomaly detection notification (inter-vehicle communication message) differ from those illustrated in the second embodiment. The transfer condition in the present embodiment is that the number of times of transfer having been performed up to receiving an anomaly detection notification from a vehicle (device in the vehicle) that has detected an unauthorized frame and transmitted the anomaly detection notification is smaller than a predetermined number of times. Message count information is included in the inter-vehicle communication message serving as the anomaly detection notification, and the vehicle (device in the vehicle) that has received the anomaly detection notification performs determination regarding whether or not the transfer condition has been satisfied, based on the count information included in the received anomaly detection notification. In a case where determination is made that the transfer condition is satisfied at the vehicle receiving the anomaly detection notification, transmission (transfer) of the received anomaly detection notification is then performed upon having updated the count information included in the anomaly detection notification.

Points that are the same as in the above-described first embodiment or second embodiment will be omitted regarding the inter-vehicle communication system according to the fifth embodiment, and points of difference will be described here.

5.1 Transmission of Inter-Vehicle Communication Message

Figure 22:
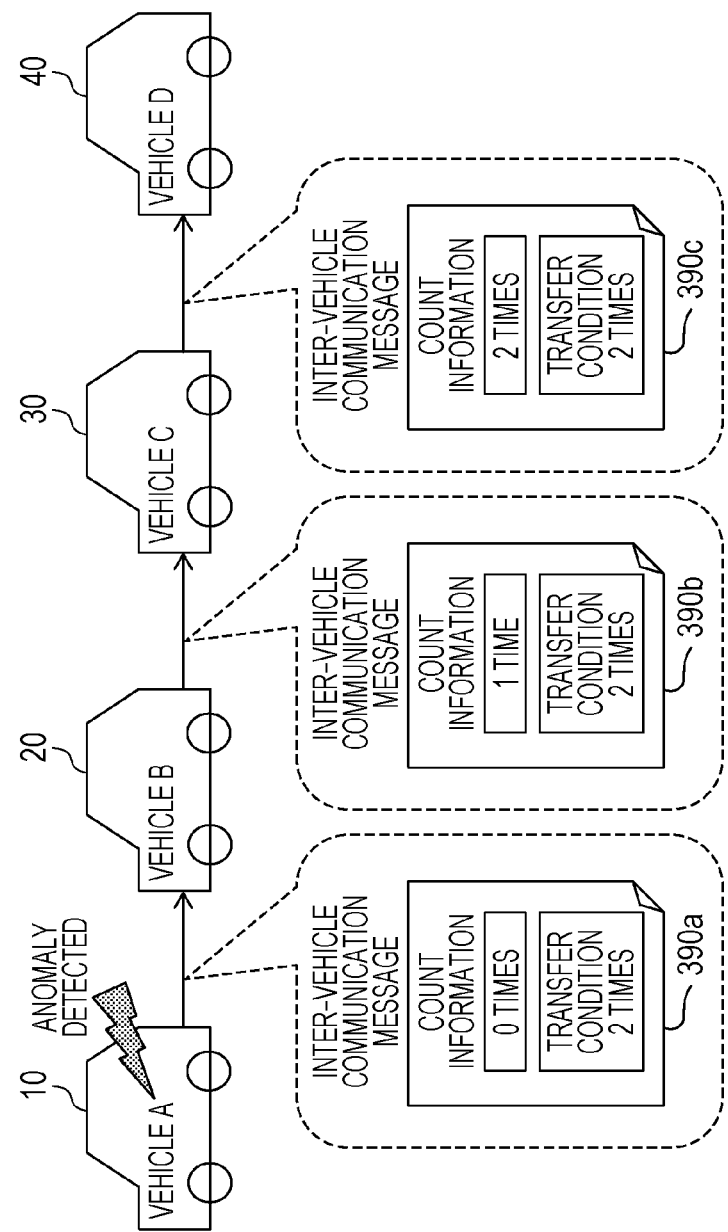
FIG. 22 is a diagram illustrating an example of multiple vehicles consecutively notifying inter-vehicle communication messages to vehicles following behind, according to a fifth embodiment.

FIG. 22 is a diagram illustrating an example of multiple vehicles consecutively notifying inter-vehicle communication messages as anomaly detection notifications to vehicles following behind. A vehicle which has received an inter-vehicle communication message as an anomaly detection notification transfers the anomaly detection notification in a case where the transfer condition is satisfied. The transfer condition in the example in FIG. 22 is that the number of times that the anomaly detection notification has been transferred until reception thereof from the unauthorized vehicle is smaller than a predetermined number of times (twice here).

In this example, an anomaly is detected at the vehicle 10 (vehicle A), and an inter-vehicle communication message 390a is transmitted as an anomaly detection notification from vehicle A to other vehicles. The inter-vehicle communication message 390a includes count information indicating zero times as the number of times as transfer, and includes condition information indicating that the transfer condition is less than two times. The vehicle 20 (vehicle B) following behind the vehicle A receives the inter-vehicle communication message 390a from the vehicle A, and since the count (zero times) that the count information indicates satisfies less than two times which is the transfer condition, transfers an inter-vehicle communication message 390b including information relating to the anomaly detection, to transfer information relating to the anomaly detection included in the inter-vehicle communication message 390a to other vehicles. The vehicle B includes count information indicating one time as the transfer count in the inter-vehicle communication message 390b. The vehicle 30 (vehicle C) following behind the vehicle B receives the inter-vehicle communication message 390b from the vehicle B, and since the count (one time) that the count information indicates satisfies less than two times which is the transfer condition, transfers an inter-vehicle communication message 390c including information relating to the anomaly detection, to transfer information relating to the anomaly detection included in the inter-vehicle communication message 390b to other vehicles. The vehicle C includes count information indicating two times as the transfer count in the inter-vehicle communication message 390c. The vehicle 40 (vehicle D) following behind the vehicle C receives the inter-vehicle communication message 390c from the vehicle C. The count (two times) that the count information of the received inter-vehicle communication message 390c indicates does not satisfy less than two times which is the transfer condition at the vehicle D, so transfer is not performed.

5.2 Inter-Vehicle Communication Message Format

FIG. 23 is a diagram illustrating an example of the configuration of the inter-vehicle communication message according to the present embodiment. The inter-vehicle communication message 390a according to the present embodiment (as well as the inter-vehicle communication messages 390b and 390c) has a configuration where a count information 391 for storing the transfer count, and a condition information 392 indicating transfer conditions, have been added to the configuration of the inter-vehicle communication message 300 illustrated in the first embodiment (see FIG. 8). Accordingly, the range over which retransmission (transfer) will be performed can be restricted.

The transfer condition indicated by the condition information 392 is that the number of times that the anomaly detection notification has been transferred until reception thereof from the vehicle (device of the vehicle) that has detected the unauthorized frame and transmitted the anomaly detection notification, is smaller than a predetermined number of times. The condition information 392 indicates less than two times, as a specific example.

The count information 391 indicates the transfer count. This is incremented by 1 when transferred at a vehicle that transfers the inter-vehicle communication message.

5.3 Advantages of Fifth Embodiment

According to the anomaly handling method used by the inter-vehicle communication system of the fifth embodiment, multiple vehicles following being the vehicle where the anomaly has been detected can transition to a safe state, in the same way as the anomaly handling method illustrated in the second embodiment. Accordingly, a large accident where three or more vehicles are involved can be prevented. Also, vehicles far away enough from the vehicle where the anomaly has been detected to where a predetermined number of transfer times of the anomaly detection notification is necessary are not controlled to transition to a safe state, so traffic congestion and the like can be prevented.

Other Embodiments

The first through fifth embodiments have thus been described above as examples of the art relating to the present disclosure. However, the art relating to the present disclosure is not restricted to this, and also is applicable to embodiments where modifications, substitutions, additions, omissions, and so forth have been performed as appropriate. For example, the following modifications are also included in an embodiment of the present disclosure.

(1) Although an example of inter-vehicle communication has been illustrated in the above embodiments where an inter-vehicle communication message is transmitted from a vehicle ahead to a vehicle behind as an anomaly detection notification, the transmission destination is not restricted to vehicles behind, and it is sufficient for the anomaly detection notification to be transmitted to other vehicles situated nearby the own vehicle (e.g., in front of, to the side, etc.). For example, instead of using a transmission antenna having directivity behind the own vehicle by the vehicle that has detected an anomaly for inter-vehicle communication, the anomaly detection notification may be transmitted uniformly in all directions. In this case, traveling vehicles that have received the inter-vehicle communication message as an anomaly detection notification may measure the position and direction of travel (bearing angle of the vehicle) of the own vehicle, and reference the unauthorized vehicle position information in the inter-vehicle communication message serving as an anomaly detection notification, and thereby execute anomaly handling processing, transfer of the anomaly detection notification, and so forth, only in a case where the unauthorized vehicle is situated in the direction of travel of the own vehicle. Also, each vehicle may be arranged so that once the own vehicle has transferred the inter-vehicle communication message serving as the anomaly detection notification that has been received, and thereafter re-received the anomaly detection notification transferred by another vehicle based on that anomaly detection notification (i.e., anomaly detection notifications including information relating to the same anomaly detection), transfer is not performed.

(2) Although description has been made in the above embodiments that level changing conditions indicating predetermined level changing rules are included in the inter-vehicle communication message, this may be stored in a device within the vehicle (e.g., level interpreting unit or the like) instead of being included in the inter-vehicle communication message, and referenced as necessary. An arrangement may also be made in the same way regarding condition information indicating transfer conditions where this is stored in a device within the vehicle (e.g., level interpreting unit or the like) instead of being included in the inter-vehicle communication message, and referenced as necessary.

(3) Although four stages of levels (security levels) have been described in the above embodiments as values of level information, the number of level divisions may be more than or less than four.

(4) Although description has been made in the above embodiments that the level of the level information is set for each function type determined by the frame ID of the unauthorized frame as illustrated in FIG. 7, different levels may be set even though the function types are the same, or levels may be set for each frame ID, or each ECU to which the frame ID of the unauthorized frame is to be transmitted for example, in accordance with the content or the like of the unauthorized frame. Note that the level information 307 may be used instead of the reset level information 311 illustrated in the third embodiment, or at the time of transmitting (transferring) the anomaly detection notification (inter-vehicle communication message) received at each vehicle, the level information 307 included in the received anomaly detection notification may be changed based on level changing conditions indicating the predetermined level changing rules (e.g., a condition where the received level information 307 is decremented by 1 if 2 or more, or the like), and a anomaly detection notification including the level information 307 after changing may be transmitted (transferred).

(5) Although description has been made in the above embodiments that the vehicle has installed therein an onboard network made up of a CAN bus and ECUs connected thereto, the onboard network may be any communication network and is not restricted to a CAN bus, as long as a communication network that communicates between onboard devices such as ECUs or the like in a vehicle.

(6) Predetermined conditions (transfer conditions) relating to determination at vehicles of whether or not to transfer anomaly detection notifications have been described in the above embodiments as distance between vehicles or transfer counts. However, transfer conditions may be conditions regarding the amount of time elapsed from a clock time at which an anomaly detection has been made. For example, a transfer condition may be a condition that the elapsed time from a clock time that clock time information included in the received anomaly detection notification is shorter than a predetermined time (certain upper limit threshold value). To this end, clock time information indicating the clock time at which the anomaly was detected is preferably included in the anomaly detection notification transmitted by the vehicle that has detected the anomaly.

(7) The anomaly detection notification described in the above embodiments is not restricted to being transmitted as an inter-vehicle communication message of the format illustrated in FIG. 8 and so forth, and may be transmitted in any inter-vehicle communication format as long as contents enabling selection of anomaly handling processing to be executed in a vehicle receiving the anomaly detection notification (e.g., unauthorized message ID, security level, etc.) are included.

(8) The functional distribution of the components that the vehicle described in the embodiments has is only exemplary, and the distribution may be changed. For example, one or multiple ECUs provided to a vehicle that receives anomaly detection notifications in the inter-vehicle communication system may have a function as a receiving unit that receives an anomaly detection notification transmitted from a device installed in a vehicle other than the vehicle to which the own unit is installed when an unauthorized frame is detected on an onboard network installed in the other vehicle, and a function serving as an anomaly handling unit that selects anomaly handling processing to execute from a plurality of predetermined anomaly handling processing in accordance with the content of the anomaly detection notification received by the receiving unit, and executes the selected anomaly handling processing. One or multiple devices (e.g., ECUs) connected to an onboard network provided to a vehicle that transmits anomaly detection notifications may have a function as an anomaly detection unit (unauthorized frame detection unit) that detects unauthorized frames transmitted over the onboard network, and a function as a transmission unit that transmits an anomaly detection notification to a vehicle other than the vehicle in which the own unit is installed when an unauthorized frame is detected by the anomaly detection unit.

(9) Although the devices (e.g., ECUs anomaly detection ECU, etc.) in the above embodiments have been described as being devices having digital circuits such as a processor, memory, and so forth, analog circuits, communication circuits, and so forth, for example, the devices may include other hardware components such as a hard disk, display, keyboard, mouse, and so forth. The functions thereof may be realized by dedicated hardware (digital circuits and so forth) instead of realizing the functions by software by a control program stored in memory being executed by the processor.

(10) Part or all of the components of which the devices described in the above embodiments are configured may be configured as one system LSI (Large Scale Integration). A system LSI is a super-multifunctional LSI fabricated with multiple components integrated on a single chip, and specifically is a computer system configured including a microprocessor, ROM, RAM, and so forth. The RAM stores the computer program. The system LSI achieves its functions by the microprocessor operating according to the computer program. The components of which the above-described devices are configured may each be independently formed as a single chip, or part or all may be included in a single chip. While a system LSI has been mentioned, there are different names according to the degree of integration, such as IC, LSI, super LSI, and ultra LSI. The way in which the integrated circuit is formed is not restricted to LSIs, and may be realized by dedicated circuits or general-purpose processors. A FPGA (Field Programmable Gate Array) capable of being programmed after manufacturing the LSI, or a reconfigurable processor of which the connections and settings of circuit cells within the LSI can be reconfigured, may be used. Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(11) Part or all of the components of which the above-described devices are configured may be configured as an IC card detachably mountable to each device, or a standalone module. The IC card or the module is a computer system configured including a microprocessor, ROM, RAM, and so forth. The IC card or the module may include the above-described super-multifunctional LSI. The IC card or the module achieves its functions by the microprocessor operating according to the computer program. The IC card or the module preferably is tamper-resistant.

(12) The present disclosure may in one form be the anomaly handling method illustrated in FIGS. 9, 11, 14, 15, 19, 20, and so forth, may be a computer program which realizes these methods by a computer, or may be digital signals made up of the computer program. The present disclosure may in one form be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the digital signals recorded in these recording mediums. The present disclosure may in one form be an arrangement where the computer program or the digital signals are transmitted over an electric communication line, wireless or cable communication line, a network of which the Internet is representative, data broadcasting, or the like. The present disclosure may in one form be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

(13) Forms realized by optionally combining the components and functions exemplified in the above-described embodiments and the above-described modifications are also included in the scope of the present disclosure.

This present disclosure is applicable to control other vehicles in a case where the possibility that one vehicle will be unauthorizedly controlled is high, so as to suppress the effects thereof.

What is claimed is:

1. An anomaly handling method used in one or a plurality of electronic control units (ECUs) installed in one vehicle, the anomaly handling method comprising:
   receiving an anomaly detection notification transmitted from a device installed in another vehicle, the anomaly detection notification being issued when an unauthorized frame is detected in an onboard network which is installed in the other vehicle, wherein the anomaly detection notification includes (i) level information indicating one of a plurality of levels and (ii) a location of the other vehicle;
   selecting an anomaly handling process from a plurality of predetermined anomaly handling processes in accordance with the one of the plurality of levels indicated by the level information;
   executing the selected anomaly handling process;
   obtaining a location of the one vehicle;
   determining whether a distance between the location of the other vehicle and the location of the one vehicle is within a predetermined range or not;
   when the distance is within the predetermined range, changing the level information by referring to level change condition in which a plurality of rules to change level information is defined, each of the plurality of rules corresponding to each of predetermined distance ranges between the other vehicle and the one vehicle, and transmitting changed anomaly detection information to other vehicle; and
   when the distance is not within the predetermined range, not transmitting the received anomaly detection information to the other vehicle,
   wherein
   the plurality of rules includes (i) a first rule indicating that a current level included in the level information is maintained when the distance is shorter than a first predetermined distance, (ii) a second rule indicating that the current level is decremented by one level when the distance is longer than or equal to the first predetermined distance and shorter than a second predetermined distance, and (iii) a third rule indicating that the current level is decremented by two levels when the distance is longer than or equal to the second predetermined distance and shorter than a third predetermined distance.

2. The anomaly handling method according to claim 1, wherein in the selecting, (i) selecting the anomaly handling process by referencing handling information where each of the plurality of predetermined anomaly handling processes is correlated with each of the plurality of levels, and (ii) selecting the anomaly handling process corresponding to the handling information by the level indicated by the level information included in the anomaly detection notification.

3. The anomaly handling method according to claim 2, wherein each of the plurality of anomaly handling processes includes at least one of (i) control to stop traveling of the one vehicle, (ii) control to cause the one vehicle to proceed slowly, (iii) control for the one vehicle to maintain inter-vehicle distance as to a vehicle ahead within a certain range, and (iv) control to notify the driver of the one vehicle.

4. The anomaly handling method according to claim 1, further comprising determining whether or not a predetermined condition is satisfied based on contents of the anomaly detection notification, and in case that in the determining, determining the predetermined condition is satisfied, in the transmitting, transmitting the anomaly detection notification externally from the one vehicle, and in case that the predetermined condition is not satisfied, in the transmitting, not transmitting the anomaly detection notification.

5. The anomaly handling method according to claim 1, wherein
   the first predetermined distance is shorter than the second predetermined distance, and
   the second predetermined distance is shorter than the third predetermined distance.

6. The anomaly handling method according to claim 5, wherein
   the determining determines that the distance is within the predetermined range when the distance is shorter than the third predetermined distance.

7. The anomaly handling method according to claim 6, wherein,
   the plurality of levels includes a first level that controls the one vehicle to be stopped, a second level that controls the one vehicle to lower its speed, a third level to control the one vehicle to be driven with a predetermined distance to the other vehicle, and a fourth level that notifies a driver of the one vehicle.

8. The anomaly handling method according to claim 5, wherein,
   the plurality of levels includes a first level that controls the one vehicle to be stopped, a second level that controls the one vehicle to lower its speed, a third level to control the one vehicle to be driven with a predetermined distance to the other vehicle, and a fourth level that notifies a driver of the one vehicle.

9. The anomaly handling method according to claim 1, wherein,
the plurality of levels includes a first level that controls the one vehicle to be stopped, a second level that controls the one vehicle to lower its speed, a third level to control the one vehicle to be driven with a predetermined distance to the other vehicle, and a fourth level that notifies a driver of the one vehicle.

10. The anomaly handling method according to claim 1, wherein,
the plurality of levels includes a first level that controls the one vehicle to be stopped, a second level that controls the one vehicle to lower its speed, a third level to control the one vehicle to be driven with a predetermined distance to the other vehicle, and a fourth level that notifies a driver of the one vehicle.

11. An anomaly handling method that handles unauthorized situations by performing communication among first and second vehicles, the anomaly handling method comprising:
transmitting from a device installed in the first vehicle an anomaly detection notification at the time of detecting an unauthorized frame in an onboard network installed in the first vehicle;
receiving the anomaly detection notification by one or a plurality of electronic control units installed in the second vehicle, wherein the anomaly detection notification includes (i) level information indicating one of a plurality of levels and (ii) a location of the first vehicle;
selecting anomaly handling process from a plurality of predetermined anomaly handling processes in accordance with the one of the plurality of levels indicated by the level information;
executing the selected anomaly handling process;
obtaining a location of the second vehicle;
determining whether a distance between the location of the first vehicle and the location of the second vehicle is within a predetermined range or not;
when the distance is within the predetermined range, changing the level information by referring to level change condition in which a plurality of rules to change level information is defined, each of the plurality of rules corresponding to each of predetermined distance ranges between the first vehicle and the second vehicle, and transmitting changed anomaly detection information to first vehicle; and
when the distance is not within the predetermined range, not transmitting the received anomaly detection information to the first vehicle,
wherein
the plurality of rules includes (i) a first rule indicating that a current level included in the level information is maintained when the distance is shorter than a first predetermined distance, (ii) a second rule indicating that the current level is decremented by one level when the distance is longer than or equal to the first predetermined distance and shorter than a second predetermined distance, and (iii) a third rule indicating that the current level is decremented by two levels when the distance is longer than or equal to the second predetermined distance and shorter than a third predetermined distance.

12. The anomaly handling method according to claim 11, wherein, when the unauthorized frame is detected, the device installed in the first vehicle performs the transmission including the anomaly detection notification indicating one level selected based on, of the plurality of levels predetermined by dividing frame IDs, the frame ID of the unauthorized frame, and
wherein the one or plurality of electronic control units installed in the second vehicle perform the selection of anomaly handling process in accordance with the level indicated by the level information included in the anomaly detection notification.

13. An electronic control unit in one vehicle, the electronic control unit comprising:
a processor; and
a memory having a program stored therein, the program causing the processor to execute operations including
receiving an anomaly detection notification transmitted from a device installed in another vehicle, the anomaly detection notification being issued when an unauthorized frame is detected in an onboard network which is installed in the other vehicle, wherein the anomaly detection notification includes (i) level information indicating one of a plurality of levels and (ii) a location of the other vehicle;
selecting an anomaly handling process from a plurality of predetermined anomaly handling processes in accordance with the one of the plurality of levels indicated by the level information;
executing the selected anomaly handling process;
obtaining a location of the one vehicle;
determining whether a distance between the location of the other vehicle and the location of the one vehicle is within a predetermined range or not;
when the distance is within the predetermined range, changing the level information by referring to level change condition in which a plurality of rules to change level information is defined, each of the plurality of rules corresponding to each of predetermined distance ranges between the other vehicle and the one vehicle, and transmitting changed anomaly detection information to other vehicle; and
when the distance is not within the predetermined range, not transmitting the received anomaly detection information to the other vehicle,
wherein
the plurality of rules includes (i) a first rule indicating that a current level included in the level information is maintained when the distance is shorter than a first predetermined distance, (ii) a second rule indicating that the current level is decremented by one level when the distance is longer than or equal to the first predetermined distance and shorter than a second predetermined distance, and (iii) a third rule indicating that the current level is decremented by two levels when the distance is longer than or equal to the second predetermined distance and shorter than a third predetermined distance.

* * * * *